US012666452B2

(12) United States Patent
Lee et al.

(10) Patent No.: US 12,666,452 B2
(45) Date of Patent: Jun. 23, 2026

(54) DEVICE AND METHOD FOR MULTI-SUBSCRIBER IDENTITY MODULE WIRELESS COMMUNICATION

(71) Applicant: Samsung Electronics Co., Ltd., Suwon-si (KR)

(72) Inventors: Junkyoung Lee, Yongin-si (KR); Ohseok Kim, Yongin-si (KR); Hasung Kim, Yongin-si (KR); Wijun Lee, Yongin-si (KR); Sangmin Choi, Suwon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 537 days.

(21) Appl. No.: 17/673,260

(22) Filed: Feb. 16, 2022

(65) Prior Publication Data

US 2022/0272688 A1    Aug. 25, 2022

(30) Foreign Application Priority Data

Feb. 19, 2021    (KR) ........................ 10-2021-0022694
May 24, 2021    (KR) ........................ 10-2021-0066490

(51) Int. Cl.
*H04W 76/15*        (2018.01)
*H04L 5/00*        (2006.01)
(Continued)

(52) U.S. Cl.
CPC ........... *H04W 72/51* (2023.01); *H04L 5/0051* (2013.01); *H04L 65/1016* (2013.01);
(Continued)

(58) Field of Classification Search
CPC ... H04W 72/51; H04W 8/183; H04W 72/563; H04W 76/15; H04W 88/06;
(Continued)

(56) References Cited

U.S. PATENT DOCUMENTS 8,351,981 B2    1/2013  Matada et al.
9,362,988 B2    6/2016  Soliman et al.
(Continued)

FOREIGN PATENT DOCUMENTS

KR    10-2016-0050448 A    5/2016
KR    10-2019-0131547 A    11/2019
KR    10-2020-0104665 A    9/2020

OTHER PUBLICATIONS

Taiwan Office Action issued Sep. 15, 2025 in Taiwan Patent Application No. 111106101.
(Continued)

*Primary Examiner* — Derrick W Ferris
*Assistant Examiner* — M Mostazir Rahman
(74) *Attorney, Agent, or Firm* — Harness, Dickey & Pierce, P.L.C.

(57) ABSTRACT

An operating method of a user equipment supporting dual subscriber identity module (SIM) dual active (DSDA), the method including performing a first communication with a first base station through a first network via radio frequency (RF) transmission paths allocated to a first SIM, the transmission paths being included in a set of RF transmission paths of the user equipment, determining whether the set of RF transmission paths includes more than the RF transmission paths in response to a resource allocation request from a second SIM, the resource allocation request corresponding to a second communication with a second base station through a second network, and allocating at least one of the RF transmission paths to each of the first SIM and the second SIM based on a time division multiplexing (TDM) scheme in response to determining the set of RF transmission paths does not include more than the RF transmission paths.

20 Claims, 14 Drawing Sheets

(51) Int. Cl.

| | | |
|---|---|---|
| *H04L 65/1016* | (2022.01) | |
| *H04W 8/18* | (2009.01) | |
| *H04W 72/51* | (2023.01) | |
| *H04W 72/563* | (2023.01) | |

(52) U.S. Cl.
CPC ......... *H04W 8/183* (2013.01); *H04W 72/563*
(2023.01); *H04W 76/15* (2018.02)

(58) Field of Classification Search
CPC .......... H04W 72/0453; H04W 52/0248; H04L
5/0051; H04L 65/1016; H04L 65/1059
See application file for complete search history.

(56) References Cited

U.S. PATENT DOCUMENTS

| | | | |
|---|---|---|---|
| 10,506,666 | B2 | 12/2019 | Rice et al. |
| 10,523,375 | B2 | 12/2019 | Dev et al. |
| 10,856,350 | B2 | 12/2020 | Qiu et al. |
| 2014/0228070 | A1 | 8/2014 | Josso et al. |
| 2015/0295692 | A1* | 10/2015 | Gowda ................. H04L 1/1854 |
| | | | 370/336 |
| 2015/0327159 | A1* | 11/2015 | Gude ................... H04W 48/18 |
| | | | 455/434 |
| 2016/0049976 | A1 | 2/2016 | Krishnamoorthi et al. |
| 2017/0034814 | A1* | 2/2017 | Kinthada Venkata ...................... |
| | | | H04L 1/0009 |
| 2017/0265114 | A1* | 9/2017 | Sahu ................... H04L 65/1069 |
| 2018/0255450 | A1* | 9/2018 | Kumar ................. H04W 76/28 |
| 2019/0053130 | A1* | 2/2019 | Guo ..................... H04L 1/0026 |
| 2019/0356445 | A1* | 11/2019 | Manolakos .......... H04B 7/0805 |
| 2020/0344711 | A1 | 10/2020 | Stille et al. |
| 2021/0006963 | A1* | 1/2021 | Chauhan ............... H04L 1/0026 |
| 2021/0076440 | A1* | 3/2021 | Qiu ...................... H04W 88/06 |
| 2021/0127256 | A1* | 4/2021 | Li ....................... H04W 60/005 |
| 2021/0282103 | A1* | 9/2021 | Zhu ...................... H04W 76/15 |

OTHER PUBLICATIONS

Korean Office Action issued Feb. 6, 2026 in Korean Patent Application No. 10-2021-0066490.

* cited by examiner

FIG. 8A

```
1. Tx port 0 grant
2. Tx port 1 grant
3. Tx port 0 and Tx port 1 grant
4. Reject
5. Wait
```

FIG. 8B

```
1. Tx port change from 0 to 1
2. Tx port change from 1 to 0
3. Add Tx port 0
4. Add Tx port 1
5. Remove Tx port 0
6. Remove Tx port 1
```

DEVICE AND METHOD FOR MULTI-SUBSCRIBER IDENTITY MODULE WIRELESS COMMUNICATION

CROSS-REFERENCE TO RELATED APPLICATIONS

This application is based on and claims priority under 35 U.S.C. § 119 to Korean Patent Application Nos. 10-2021-0022694, filed on Feb. 19, 2021, and 10-2021-0066490, filed on May 24, 2021, in the Korean Intellectual Property Office, the disclosures of which are incorporated by reference herein in their entirety.

BACKGROUND

The inventive concepts relate to wireless communication, and more particularly, to a method and device for multi-subscriber identity module (SIM) wireless communication.

Multi-SIM devices such as mobile phones, personal digital assistants (PDAs), tablet computers, and laptop computers may include two or more SIM cards. Each of the SIM cards may include international mobile subscriber identity (IMSI) information and key information which enables a user of a multi-SIM device to be checked and authenticated by a service provider.

Multi-SIM wireless communication may enable a terminal to access two different network services. For example, the terminal may include a plurality of SIMs (or a plurality of SIM cards), and the plurality of SIMs may respectively correspond to different accounts and/or phone numbers. The terminal may be implemented with a plurality of protocol stacks so as to drive a plurality of wireless communications corresponding to a plurality of SIMs.

When user equipment supporting multi-SIM is a dual SIM dual standby (DSDS) device, a plurality of SIMs share one radio frequency (RF) resource, and thus, when RF resource use periods of the SIMs overlap, the communication performance of the multi-SIM device is reduced on an SIM to which an RF resource is not allocated. On the other hand, when the user equipment supporting multi-SIM is a dual SIM dual active (DSDA) device, because a plurality of RF sources are allocated to each of a plurality of SIMs, better communication performance may be provided than a case where the user equipment is the DSDS device, but because additional hardware or software resources are used, the cost for producing a multi-SIM device and the power consumption amount of the multi-SIM device increase.

SUMMARY

The inventive concepts provide a multi-subscriber identity module (SIM) device and an operating method thereof, which efficiently support a network service to a plurality of SIMs by using fewer radio frequency (RF) transmission paths than a conventional dual SIM dual active (DSDA) scheme, so as to provide communication performance improved compared to a conventional dual SIM dual standby (DSDS) device while decreasing costs compared to a conventional DSDA device, and reduce the amount of power consumption.

According to an aspect of the inventive concepts, there is provided an operating method of a user equipment supporting dual subscriber identity module (SIM) dual active (DSDA), the operating method including performing a first communication with a first base station through a first network via a plurality of radio frequency (RF) transmission paths allocated to a first SIM, the plurality of RF transmission paths being included in a set of RF transmission paths of the user equipment, determining whether the set of RF transmission paths includes more than the plurality of RF transmission paths in response to a resource allocation request from a second SIM, the resource allocation request corresponding to a second communication with a second base station through a second network, and allocating at least one of the plurality of RF transmission paths to each of the first SIM and the second SIM based on a time division multiplexing (TDM) scheme in response to determining the set of RF transmission paths does not include more than the plurality of RF transmission paths.

According to an aspect of the inventive concepts, there is provided a user equipment supporting dual subscriber identity module (SIM) dual active (DSDA), the user equipment including a first SIM and a second SIM, a transmitter configured to form a set of radio frequency (RF) transmission paths, and processing circuitry configured to allocate a plurality of RF transmission paths to the first SIM to perform first communication with a first base station through a first network, the plurality of RF transmission paths being included in the set of RF transmission paths, determine whether the set of RF transmission paths includes more than the plurality of RF transmission paths in response to a resource allocation request from the second SIM, the resource allocation request corresponding to a second communication with a second base station through a second network, and allocate at least one of the plurality of RF transmission paths to each of the first SIM and the second SIM based on a time division multiplexing (TDM) scheme in response to determining the set of RF transmission paths does not include more than the plurality of RF transmission path.

According to an aspect of the inventive concepts, there is provided a user equipment supporting multi subscriber identity module (SIM) multi active (MSMA), the user equipment including a first SIM configured to use an Internet packet data network (PDN) service over a first network, a second SIM configured to use an Internet protocol multimedia subsystem (IMS) PDN service over a second network, a transmitter configured to form a plurality of radio frequency (RF) transmission paths, and processing circuitry configured to reallocate at least one of the plurality of RF transmission paths from the first SIM to the second SIM based on a transmission resource allocation request from the second SIM, and output Internet data from the first SIM and call data from the second SIM while the first SIM and the second SIM are both in a radio resource control (RRC) connected state simultaneously.

BRIEF DESCRIPTION OF THE DRAWINGS

Embodiments of the inventive concepts will be more clearly understood from the following detailed description taken in conjunction with the accompanying drawings in which:

FIGS. 8A and 8B illustrate embodiments of a transmission resource response message transmitted by the transmission controller of FIG. 6;

DETAILED DESCRIPTION

Hereinafter, embodiments will be described in detail with reference to the accompanying drawings.

Figure 1:
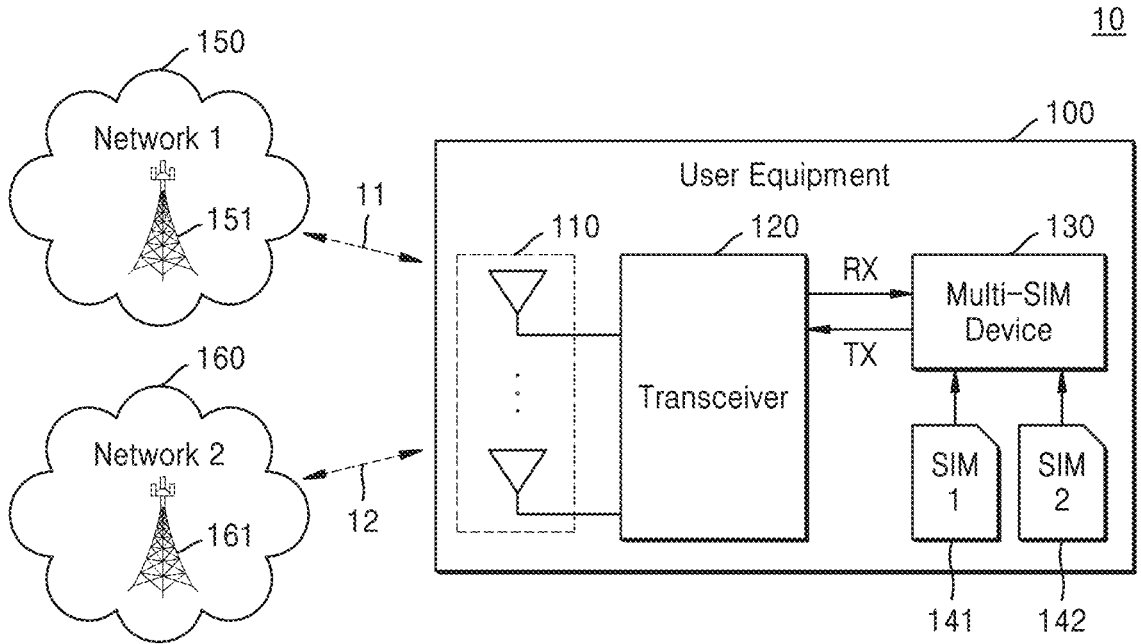
FIG. 1 is a block diagram schematically illustrating a wireless communication system according to embodiments.

FIG. 1 is a block diagram schematically illustrating a wireless communication system 10 according to embodiments.

Referring to FIG. 1, the wireless communication system 10 may include a first network 150, a second network 160, and user equipment (UE) 100.

In embodiments, the wireless communication system 10 may include a 5$^{th}$ generation new radio wireless communication (5G NR) system, a 4$^{th}$ generation long term evolution wireless communication (4G LTE) system, a code division multiple access (CDMA) system, a wideband code division multiple access (WCDMA) system, a global system for mobile communications (GSM) system, a wireless local area network (WLAN) system, or another wireless communication system, and moreover, may include a wireless communication system where a plurality of wireless communication systems described above are combined.

The UE 100 may be wireless communication equipment and may be defined as a main agent which communicates with a base station(s) (for example, base stations 151 and/or 161) or another UE. The UE 100 may be stationary or may have portability, and may denote equipment for wirelessly communicating with a base station 151 and/or 161 to transmit or receive data and/or control information. For example, the UE 100 may be referred to as UE, a mobile station (MS), a mobile terminal (MT), a user terminal (UT), a subscribe station (SS), a wireless device, and/or a handheld device. As illustrated in FIG. 1, the UE 100 may include an antenna array 110, a transceiver 120, a multi-SIM device 130, a first SIM 141, and/or a second SIM 142.

The base station 151 and/or 161 may be a main agent which communicates with the UE 100 and allocates a communication network resource to the UE 100 and may denote a fixed station which communicates with the UE 100 and/or another base station. Also, for example, the base station 151 may communicate with the base station 161 to exchange data and control information. For example, the base station 151 and/or 161 may be referred to as a Node B, and evolved Node B (eNB), a next generation Node B (gNB), a sector, a site, a base transceiver system (BTS), an access point (AP), a relay node, a remote radio head (RRH), a radio unit (RU), and/or a small cell. Herein, a base station or a cell may be construed as a comprehensive meaning, which represents some areas or functions covered by a base station controller (BSC) based on CDMA, a Node-B based on WCDMA, an eNB based on 4G LTE, and a gNB or a sector (a site) based on 5G NR, and may include all of various coverage areas such as a mega-cell, a macro-cell, a micro-cell, a pico-cell, a femto-cell, a relay node, an RRH, an RU, and a small cell communication range.

As illustrated in FIG. 1, the first base station 151 may be included in the first network 150, and the second base station 161 may be included in the second network 160. The UE 100 may access the first network 150 through the first base station 151 and may access the second network 160 through the second base station 161. The UE 100 may communicate with the first network 150 and the second network 160 on the basis of radio access technology (RAT). For example, in embodiments, in a 5G NR system and a 4G LTE system, the UE 100 may communicate with the first network 150 and the second network 160 on the basis of another RAT. In embodiments, the UE 100 may communicate with the first network 150 and the second network 160 on the basis of the same RAT or similar RATs. In embodiments, the UE 100 may communicate with the first network 150 and the second network 160 on the basis of different RATs. The UE 100 may transmit information over the first network 150 or the second network 160 on the basis of various multiple access schemes such as code division multiple access (CDMA), wideband code division multiple access (WCDMA), frequency division multiple access (FDMA), time division multiple access (TDMA), orthogonal frequency division multiple access (OFDMA), single carrier frequency division multiple access (SC-FDMA), OFDM-FDMA, OFDM-TDMA, and OFDM-CDMA. In this case, the UE 100 and the base stations 151 and 161 may communicate with each other and may transmit or receive a signal (or data) through various channels.

The UE 100 may support multi-SIM wireless communication. For example, as illustrated in FIG. 1, the UE 100 may perform first wireless communication 11 associated with the first SIM 141 on the first base station 151 included in the first network 150 and may perform second wireless communication 12 associated with the second SIM 142 on the second base station 161 included in the second network 160. Particularly, in a case where two wireless communications associated with two SIMs 141 and 142 are performed, the UE 100 may be referred to as a dual SIM device. The first wireless communication 11 and the second wireless communication 12 may be respectively referred to as a first connection and a second connection or a first subscription and a second subscription. Also, in embodiments, as illustrated in FIG. 1, two SIMs 141 and 142 (e.g., dual SIM wireless communication) will be described mainly, but it may be understood that embodiments are applied to multi-SIM wireless communication including three or more SIMs.

In embodiments, the UE 100 may support multi-SIM multi-active (MSMA). That is, in the UE 100, transmission and reception RF paths provided by the transceiver 120 may be simultaneously (or contemporaneously) used by the first SIM 141 and the second SIM 142, and the first SIM 141 and the second SIM 142 may simultaneously (or contemporaneously) transmit and receive signals. Here, each of the transmission and reception RF paths may be implemented using hardware (e.g., in the transceiver 120) and may denote a path through which radio resources move, and particularly, a transmission RF path may be referred to as a transmission module (Tx module) or a transmission RF chain (Tx RF chain).

In a case where the UE 100 transmits a signal by using the transceiver 120 so as to simultaneously (or contemporaneously) use a network service of each of the first wireless communication 11 and the second wireless communication 12, the UE 100 may transmit or receive a signal on the basis of a transmission resource sharing scheme.

For example, it may be assumed that the transceiver 120 provides two RF transmission paths, the first wireless communication 11 is 5G NR stand-alone (SA) communication involving at least two RF transmission paths, the second wireless communication 12 is 4G LTE communication involving at least one RF transmission path, and the first SIM 141 transmits signals (for example, a first transmission signal transmitted through a first RF transmission path and a second transmission signal transmitted through a second RF transmission path) as all of the two RF transmission paths are allocated to the first SIM 141 in a state where the first wireless communication 11 is connected by the two RF transmission paths by an RRC layer. In this case, in a case where the second SIM 142 uses a transmission resource to perform wireless communication with the second base station 161, the multi-SIM device 130 may allocate a transmission resource so that the second wireless communication 12 associated with the second SIM 142 uses one of two RF transmission paths which are being used by the first wireless communication 11 and may transmit a transmission resource response message, including information associated with a use authority of an RF transmission path, to a protocol stack used by the first SIM 141 and/or the second SIM 142. In embodiments, based on whether each of a plurality of RF transmission paths is available, some of the plurality of RF transmission paths may be allocated to each SIM, and the UE 100 may allocate corresponding RF transmission path(s) to the first SIM 141 and/or the second SIM 142 on the basis of a time division multiplexing (TDM) scheme. Such a scheme may be defined as a transmission resource sharing scheme.

In a conventional DSDA scheme, transmission modules equal to a total sum of transmission modules using two SIMs may be equipped in the UE 100, for simultaneous (or contemporaneous) transmission by the two SIMs. In this case, in a software operating viewpoint, the UE 100 may be more easily implemented and may be used without a degradation (or with lower degradation) in performance of each SIM, but the cost for implementation may be higher in a hardware operating viewpoint and the UE 100 may be more inefficient in a current consumption viewpoint. Particularly, one of two SIMs included in UE based on the conventional DSDA scheme may use only Internet protocol multimedia subsystem (IMS) packet data network (PDN), and the other SIM using Internet (INT) PDN may have a lower transmission time than the one SIM but the addition of a transmission module for the DSDA scheme may be more inefficient.

On the other hand, in embodiments, in a case where the UE 100 allocates a transmission resource on the basis of the transmission resource sharing scheme described above, because the first SIM 141 may not transmit a second transmission signal for a time for which the second SIM 142 transmits a signal by using a second RF transmission path which is one of two RF transmission paths, the efficiency of communication with the first network 150 may be slightly reduced, but because a duration used for allocating a transmission resource is relatively short in an SIM using only IMS PDN, there may not be a large difference in performance. Therefore, as described below with reference to FIG. 2, the multi-SIM device 130 included in the UE 100 according to embodiments may support the transmission resource sharing scheme which prevents a connection between the first wireless communication 11 and the second wireless communication 12 from being disconnected (or reduces the occurrence thereof), without changing additional hardware (for example, the transceiver 120), and thus, the UE 100 may simultaneously (or contemporaneously) transmit signals.

The antenna array 110 may include at least one antenna and may receive an RF signal from the first base station 151 and/or the second base station 161, or may transmit the RF signal from the first base station 151 and/or the second base station 161. In embodiments, the antenna array 110 may include a plurality of antennas for multi-input multi-output (MIMO).

The transceiver 120 may be a hardware device which is coupled to the antenna array 110 and the multi-SIM device 130 and may provide an RF transmission and reception resource for wireless communication. For example, the transceiver 120 may process the RF signal received through the antenna array 110 to provide a reception signal RX as a baseband signal to the multi-SIM device 130, or may process a transmission signal TX as a baseband signal to provide the RF signal to the antenna array 110. A transmitter (not shown) included in the transceiver 120 may be controlled by the multi-SIM device 130, and in embodiments, may include an RF transmission path which includes a plurality of switches, a plurality of matching circuits, a plurality of filters, a plurality of amplifiers, and/or a plurality of mixers.

In embodiments, the transceiver 120 may support carrier aggregation (CA) using a plurality of carriers. For example, the UE 100 may transmit or receive data to or from the first base station 151 and/or the second base station 161 by simultaneously (or contemporaneously) using two or more carriers each referred to as a component carrier (CC). The transceiver 120 may form RF transmission and reception paths corresponding to CCs used in CA and may process signals transmitted and received through the RF transmission and reception paths. In embodiments, the transceiver 120 may support multi-connectivity (MC), and thus, may support a plurality of independent RF transmission and reception paths. Particularly, in a case where the transceiver 120 forms two independent RF paths, the transceiver 120 may be referred to as support dual connectivity (DC). As described above, the transceiver 120 may provide RF transmission and reception paths, and the first SIM 141 or the second SIM 142 may transmit or receive a signal to or from the first network 150 or the second network 160 by using an RF transmission and reception path and allocated transmission and reception resources.

The multi-SIM device 130 may communicate with the transceiver 120 through baseband signals RX and TX and may be coupled to the first SIM 141 and the second SIM 142. The first SIM 141 may include information for accessing the first network 150 through the first wireless communication 11, and the second SIM 142 may include information for accessing the second network 160 through the second wireless communication 12. As described below with reference to FIG. 4, the multi-SIM device 130 may have an architecture for processing a connection associated with the first SIM 141 and a connection associated with the second SIM 142. Also, as described below with reference to FIG. 4, the multi-SIM device 130 may simultaneously (or contemporaneously) transmit a signal by using the first wireless communication 11 and the second wireless communication 12 on the basis of an RF transmission path provided by a hardware element (for example, the transceiver 120). Based on the transmission resource sharing scheme, the multi-SIM device 130 may control the transceiver 120 to allocate at least one RF transmission path to the first wireless communication 11 and the second wireless communication 12. In embodiments, the multi-SIM device 130 may include a hardware block designed through logical synthesis, a software block including a series of instructions, a processing unit including at least one processor executing the series of instructions, and/or a combination thereof. In embodiments, the multi-SIM device 130 may include a modem or a baseband processor.

Figure 2:
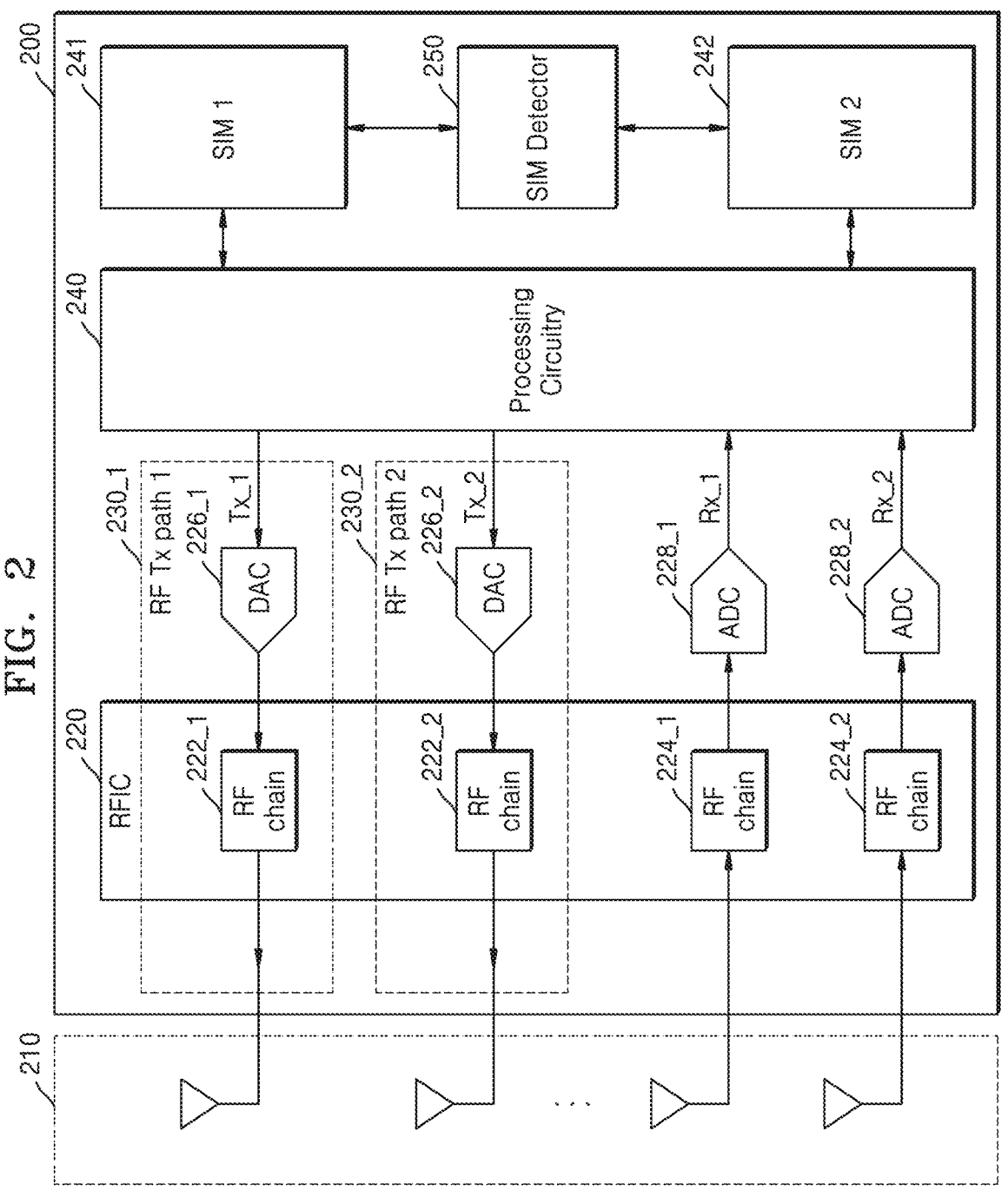
FIG. 2 is a block diagram illustrating user equipment including a plurality of multi-subscriber identity modules (SIMs), according to embodiments.

FIG. 2 is a block diagram illustrating UE 200 including a plurality of SIMs, according to embodiments. Hereinafter, the UE 200 will be described with reference to FIG. 2 in conjunction with FIG. 1.

Referring to FIG. 2, the UE 200 according to embodiments may include an antenna array 210, an RF integrated circuit (RFIC) 220 including a plurality of RF chains 222_1, 222_2, 224_1, and 224_2, a plurality of digital-to-analog converters (DACs) 226_1 and 226_2, a plurality of analog-to-digital converters (ADCs) 228_1 and 228_2, a baseband processor 240, a plurality of SIMs (for example, a first SIM and a second SIM) 241 and 242, and/or an SIM detector 250.

The transceiver 120 of FIG. 1 may be referred to as a transmitter and a receiver each configured with the RFIC 220, the DACs 226_1 and 226_2, and/or the ADCs 228_1 and 228_2 of FIG. 2, and in FIG. 2, a transmitter configured with two RC chains 222_1 and 222_2 and two DACs 226_1 and 226_2 is illustrated for example. However, the inventive concepts are not limited thereto, and a transmitter may be configured with two or more RF chains and two or more DACs.

According to embodiments, the UE 200 may provide two RF transmission paths (RF Tx path 1 and RF Tx path) 230_1 and 230_2. Each of the first SIM 241 and the second SIM 242 may use an RF transmission resource to transmit a signal by using a service of each of a first network (150 of FIG. 1) and a second network (160 of FIG. 1). For example, the UE 200 may include the first SIM 241, which is connected to 5G NR SA communication and uses two RF transmission paths, and the second SIM 242 which is connected to 4G LTE communication and uses one RF transmission path.

The baseband processor 240 may allocate an RF transmission resource to the first SIM 241 and the second SIM 242 on the basis of information about the first network and information about the second network. For convenience of description, an operation of performing, by the baseband processor 240, communication with base stations (151 and 161 of FIG. 1) by using a plurality of SIMs (for example, 241 and 242) may be referred to as an operation of performing, by the plurality of SIMs (for example, 241 and 242), communication with the base stations (151 and 161 of FIG. 1).

After the RF transmission resource is allocated by the baseband processor 240, a baseband signal may be converted into an analog signal by the DAC 226_1 or 226_2, and the analog signal may pass through a filter, a mixer, and an amplifier each included in the RF chain 222_1 or 222_2 and may be transmitted as an RF signal.

The SIM detector 250 may detect the plurality of SIMs 241 and 242 mounted on a slot. Therefore, the SIM detector 250 may detect an SIM inserted into the slot and may determine the number of inserted SIMs. Detailed embodiments of an operation of the SIM detector 250 will be described below with reference to FIG. 3.

Although not shown in FIG. 2, the UE 200 may include a memory (not shown), and the memory may store information about the first network corresponding to the first SIM 241, information about the second network corresponding to the second SIM 242, and/or capability information about the UE 200. For example, the information about the first network may include configuration information about the first network received from the first network by the first SIM 241, and the information about the second network may include configuration information about the second network received from the second network by the second SIM 242.

Figure 3:
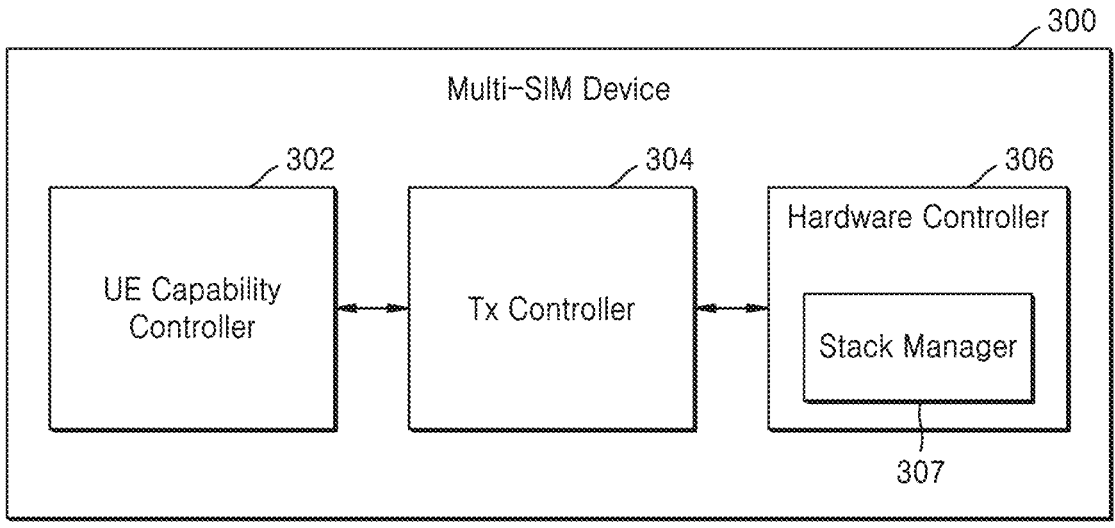
FIG. 3 is a block diagram illustrating a structure of a multi-SIM device according to embodiments.

FIG. 3 is a block diagram illustrating a structure of a multi-SIM device 300 according to embodiments. Hereinafter, in order to help understanding, exemplary details of FIG. 3 will be described with reference to FIG. 2.

The multi-SIM device 300 according to embodiments may include a UE capability controller 302, a transmission controller (Tx controller) 304, and/or a hardware controller 306.

In embodiments, the UE capability controller 302, the transmission controller 304, and/or the hardware controller 306 may be implemented as a software logic which is stored as a plurality of instruction modes in the multi-SIM device 300 and executed by a baseband processor (240 of FIG. 2). This are merely embodiments, and for example, the UE capability controller 302, the transmission controller 304, and/or the hardware controller 306 may be implemented as a combination of a hardware logic and a software logic, or may be implemented as various kinds of logics.

In embodiments, the UE capability controller 302 may generate a UE capability message including capability information about a UE (e.g., the UE 200) capable of using the transmission resource sharing scheme according to embodiments. The UE capability controller 302 may generate SIM detection information corresponding to information about the number of inserted SIMs by using an SIM detector (250 of FIG. 2). For example, when two or more SIMs being inserted is detected, the SIM detector (250 of FIG. 2) may transfer the SIM detection information to a protocol stack associated with each SIM. In this case, according to embodiments, when the number of RF transmission paths to be used by the detected multi-SIMs is more than two RF transmission paths included in UE, the multi-SIM device 300 may set the transmission resource sharing scheme. In this case, the UE capability controller 302 may generate a UE capability message, including information representing that UE including the multi-SIM 300 may use the transmission resource sharing scheme, and may provide the UE capability message to each network. A detailed operation of the UE capability controller 302 will be described below with reference to FIGS. 4 and 5.

When a transmission resource request is received from at least one SIM e.g., when a transmission resource allocation request is received), the transmission controller 304 may check a use situation of an RF transmission path and may determine a use authority of the RF transmission path. For example, the transmission controller 304 may feed back a result, corresponding to a response to a transmission resource request, to each SIM so as to change an RF transmission resource allocation state of each SIM (for example, (re)allocate an RF transmission resource, change an RF transmission path, and/or remove the allocated RF transmission resource) on the basis of the determined use authority. Operation examples of the transmission controller 304 may differ based on a correlation between the kind of a wireless communication system connected to each SIM and an RF transmission path included in UE or whether an RF transmission path is occupied when a transmission resource request is received. Detailed operation examples of the transmission controller 304 will be described below with reference to FIGS. 6 to 10.

The hardware controller 306 may include a stack manager 307, and when a response to a transmission request is received, a hardware configuration based on the response may be controlled.

The stack manager 307 may be individually implemented for each SIM, or may be integratedly implemented to manage all of a plurality of SIMs. The stack manager 307 may set a plurality of SIMs, a baseband processor, and/or a plurality of RF transmission paths on the basis of a response received from the transmission controller 304.

For example, when the hardware controller 306 receives a response "allocate an RF transmission path corresponding to a certain frequency band to a second SIM" from the transmission controller 304, the baseband processor may allocate the RF transmission path to the second SIM on the basis of a command of the transmission controller 304 and may designate a port number 1 (Tx port #1) of the RF transmission path corresponding to the certain frequency band. A port number of an RF transmission path may denote a number which is assigned to correspond to each RF transmission path and may be a value which is predetermined or alternatively, given for each RF transmission path.

Figure 4:
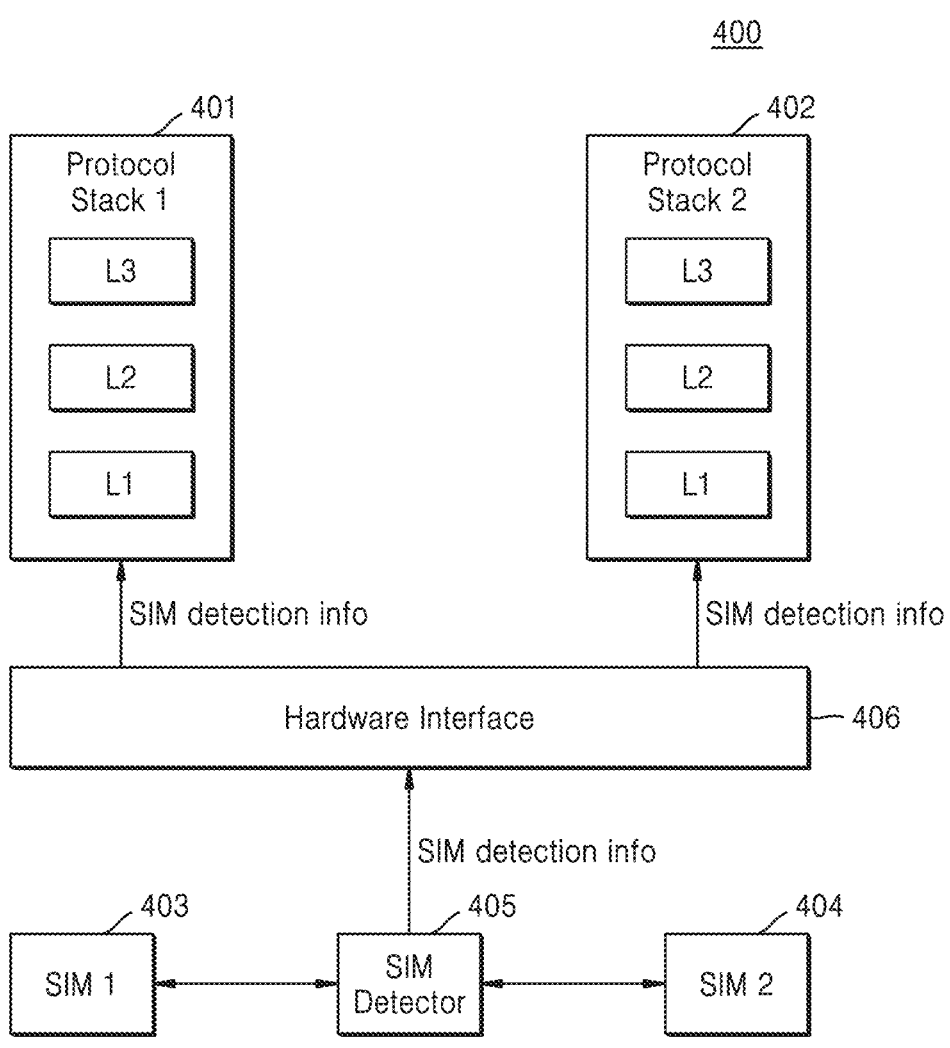
FIG. 4 is a block diagram illustrating a user equipment (UE) capability controller according to embodiments.

FIG. 4 is a block diagram illustrating a protocol stack system according to embodiments.

In detail, FIG. 4 illustrates a control plane of each of a first protocol stack 401 and a second protocol stack 402 according to embodiments, and illustrates an example of a UE capability controller 400 including a protocol stack system implemented with the first protocol stack 401 and the second protocol stack 402. In embodiments, the UE capability controller 400 including the first and second protocol stacks 401 and 402 of FIG. 4 may be implemented in the multi-SIM device 130 of FIG. 1. The multi-SIM device 130 may perform operations for wireless communication by using the UE capability controller 400 of FIG. 4, and moreover, may perform operations for wireless communication by using a transmission controller (304 of FIG. 3) or a hardware controller (306 of FIG. 3).

In embodiments, at least some of the blocks illustrated in FIG. 4 may be implemented as a hardware logic, and in embodiments, may be implemented as a software module executed by at least one processor. Hereinafter, FIG. 4 will be described with reference to FIG. 1.

Referring to FIG. 4, the UE capability controller 400 may include the first protocol stack 401 and the second protocol stack 402 respectively associated with the first SIM 403 and the second SIM 404. As described above, each of the first protocol stack 401 and the second protocol stack 402 may support a RAT. In embodiments, the first protocol stack 401 and the second protocol stack 402 may interact with a shared upper layer (for example, an application layer), and the upper layer may obtain information about first wireless communication 11 and second wireless communication 12, or may provide an interface corresponding to programs for providing commands. The upper layer may be implemented in the multi-SIM device 130, or may be implemented in another device separated from the multi-SIM device 130. Also, the UE capability controller 400 may include a hardware interface 406 shared by the first protocol stack 401 and the second protocol stack 402. The hardware interface 406 may provide an interface corresponding to hardware (e.g., the transceiver 120 of FIG. 1), and the first protocol stack 401, and the second protocol stack 402 may provide a signal to the transceiver 120 through the hardware interface 406 or may obtain a signal from the transceiver 120. In embodiments, the hardware interface 24 may be referred to as a driver of the transceiver 120.

Each of the first protocol stack 401 and the second protocol stack 402 for a control plane may include a plurality of layers. As illustrated in FIG. 4, the first protocol stack 401 may include a first layer L1, a second layer L2, and/or a third layer L3, and the first layer L1, the second layer L2, and the third layer L3 may correspond to three lower layers of an open system interconnection (OSI) model. For example, in LTE or 5G NR, a physical (PHY) layer may be included in the first layer L1, a medium access control (MAC) layer, a radio link control (RLC) layer, and a packet data convergence protocol (PDCP) layer may be included in the second layer L2, and a radio resource control (RRC) layer and a non-access stratum (NAS) layer may be included in the third layer L3. Like the first protocol stack 401, the second protocol stack 402 may include a first layer L1, a second layer L2, and/or a third layer L3.

The RRC layer of the third layer L3 may control a radio resource and may exchange an RRC message with an RRC layer of a base station (for example, 151 or 161 of FIG. 1). When an RRC connection is established between an RRC layer of UE (100 of FIG. 1) (or a multi-SIM device (130 of FIG. 1)) and the RRC layer of the base station (for example, 151 or 161 of FIG. 1), the RRC layer of UE (100 of FIG. 1) (or the multi-SIM device (130 of FIG. 1)) may be changed to an RRC connected state (or an RRC connection mode). Herein, the RRC connected state may be referred to as a connected state of wireless communication, and for example, when the RRC connected state is maintained by the RRC layer included in the first protocol stack 401, first wireless communication (11 of FIG. 1) may be referred to as being in a connected state. Likewise, second wireless communication (12 of FIG. 1) may be referred to as being in a connected state by using the RRC layer included in the second protocol stack 402. Hereinafter, it may be assumed that the first wireless communication (11 of FIG. 1) associated with the first SIM 403 and the second wireless communication (12 of FIG. 1) associated with the second SIM 404 are in a connected state.

It may be assumed that the first wireless communication (11 of FIG. 1) associated with the first SIM 403 is 5G NR SA communication involves at least two RF transmission paths and the second wireless communication (12 of FIG. 1) associated with the second SIM 404 is 4G LTE communication involves at least one RF transmission path. In this case, the UE capability controller 400 may generate SIM detection information, corresponding to information about the number of inserted SIMs, from the SIM detector 405, and the generated SIM detection information may be transferred to the first protocol stack 401 and the second protocol stack 402 through the hardware interface 406. For example, when information representing that two SIMs have been detected is transferred to the first protocol stack 401 and the second protocol stack 402, the first SIM 403 connected to the first wireless communication (11 of FIG. 1) corresponding to 5G NR SA communication may use two RF transmission paths, and thus, the UE capability controller 400 may generate a UE capability message including capability information about UE capable of using the transmission resource sharing scheme according to embodiments.

Table 1 shows an example which represents a portion of pseudo code for generating a UE capability message corresponding to the first SIM 403.

TABLE 1

```
If Multi SIM info ==TRUE,
to configure 1T4R; and
Else
to configure 2T4R;
...
```

In embodiments, based on the pseudo code of Table 1, the UE capability message corresponding to the first SIM 403 may be configured where a sounding reference signal (SRS) supporting scheme is set to 1T4R which uses one RF transmission path 1 Tx and an UL rank of an uplink is set to 2. According to embodiments, the UE capability message may include at least one of information about the SRS supporting scheme or information about the UL rank. This are merely embodiments, and the UE capability message may be configured based on another scheme. However, the inventive concepts are not limited thereto. In MIMO transmission, the number of transmission layers may be one or the maximum (e.g., highest) number of transmission antennas, on the basis of a state of a channel, and in this case, the number of transmission layers may be defined as a rank order. In other words, the number of transmission layers may denote a maximum (e.g., highest) value which enables different pieces of information to be transmitted through a channel.

The UE 100 may support one transmission antenna and four reception antenna by using the UE capability controller 400 and may generate a UE capability message including capability information representing the supporting of a maximum (e.g., upper limit) of two transmission layers, and the generated UE capability message may be transferred to the first network 150 or the second network 160 through the second layer L2 and the layer L1.

On the other hand, the second SIM 404 connected to the second wireless communication (12 of FIG. 1) corresponding to 4G LTE communication may use one RF transmission path, and thus, a UE capability message corresponding to the UE capability controller 400 may be undesired.

Figure 5:
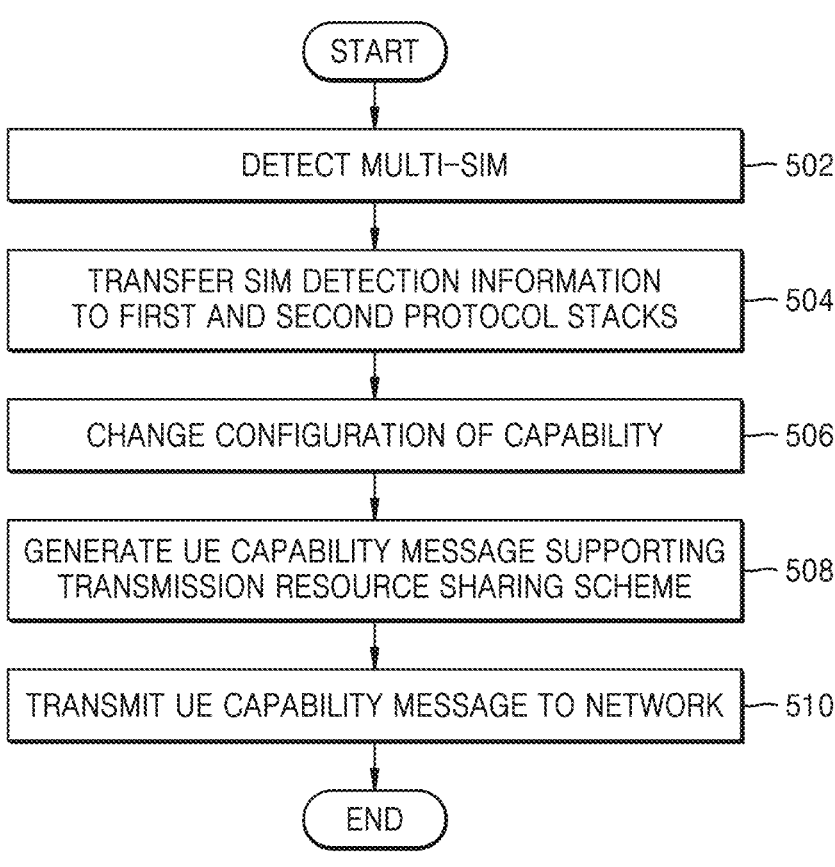
FIG. 5 is a flowchart illustrating embodiments of an operation of the UE capability controller of FIG. 4.

FIG. 5 is a flowchart illustrating embodiments of an operation of the UE capability controller of FIG. 4.

Referring to FIGS. 4 and 5, FIG. 5 illustrates an operating method of a UE capability controller (400 of FIG. 4) generating a UE capability message corresponding a first SIM (403 of FIG. 4).

In operation S502, by using a SIM detector, the UE capability controller may detect that two or more SIMs (multi-SIM) are inserted into UE.

In operation S504, by using the SIM detector, the UE capability controller may transfer SIM detection information to each of first and second protocol stacks respectively associated with the first and second SIMs.

In operation S506, the UE capability controller may change a configuration of a capability of UE by using a third layer of the first protocol stack. As in Table 1, a configuration may be changed so that an SRS supporting scheme is set to 1T4R when multi-SIMs (for example, dual SIMs) are detected, and otherwise (for example, in a single SIM), the SRS supporting scheme is set to 2T4R.

In operation S508, the UE capability controller may generate a UE capability message on the basis of the changed configuration.

In operation S510, the UE capability controller may transmit the generated UE capability message to a first network (150 of FIG. 1) or a second network (160 of FIG. 1) through a second layer (L2 of FIG. 4) and a first (L1 of FIG. 4).

Figure 6:
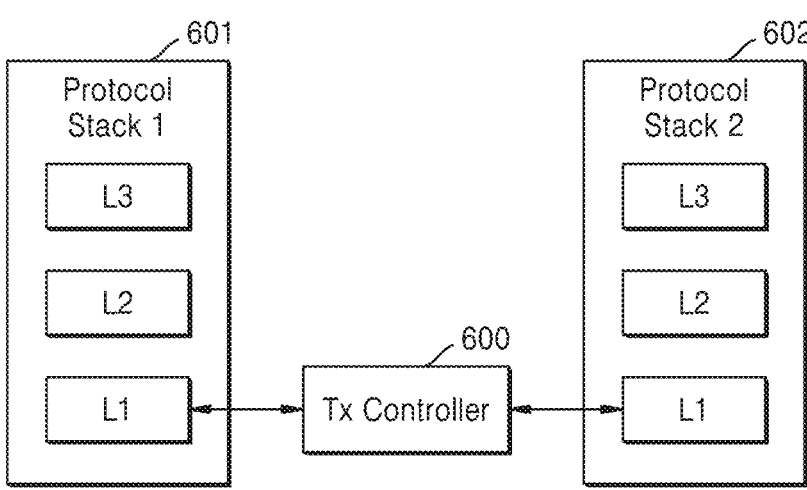
FIG. 6 is a block diagram illustrating a transmission controller according to embodiments.

FIG. 6 is a block diagram illustrating a transmission controller 600 according to embodiments.

Referring to FIGS. 4 to 6, descriptions of the first protocol stack 401 and the second protocol stack 402 illustrated in FIG. 4 may be applied to a first protocol stack 601 and a second protocol stack 602 illustrated in FIG. 6, and their repeated descriptions are omitted.

The transmission controller 600 according to embodiments may continuously or intermittently perform wireless communication (for example, first wireless communication (11 of FIG. 1) and second wireless communication (12 of FIG. 1) on a first layer L1 of each of the first protocol stack 601 and the second protocol stack 602 associated with each SIM. For example, when a radio resource is used in the first layer L1, the first protocol stack 601 (or the first layer L1) may request transmission resource allocation from the transmission controller 600.

When the transmission controller 600 receives a message (Tx resource request) requesting allocation of a radio resource, the transmission controller 600 may check a use situation of an RF transmission path and may determine a use authority of the RF transmission path.

The transmission controller 304 may feed back a response message (Tx resource response) (for example, grant, reject, or wait for one or two RF transmission resource(s)), corresponding to a transmission resource request, to a protocol stack associated with a corresponding SIM on the basis of the determined use authority, thereby responding to the corresponding SIM which has transmitted a transmission resource allocation request. According to embodiments, the transmission controller 304 may transmit a response message (Tx resource change response) (for example, add an RF transmission resource, change an RF transmission path, and/or remove an allocated RF transmission resource), requesting changing of a radio resource so as to change a transmission resource allocation state, to a protocol stack associated with another SIM which does not transmit the transmission resource allocation request.

Figure 7:
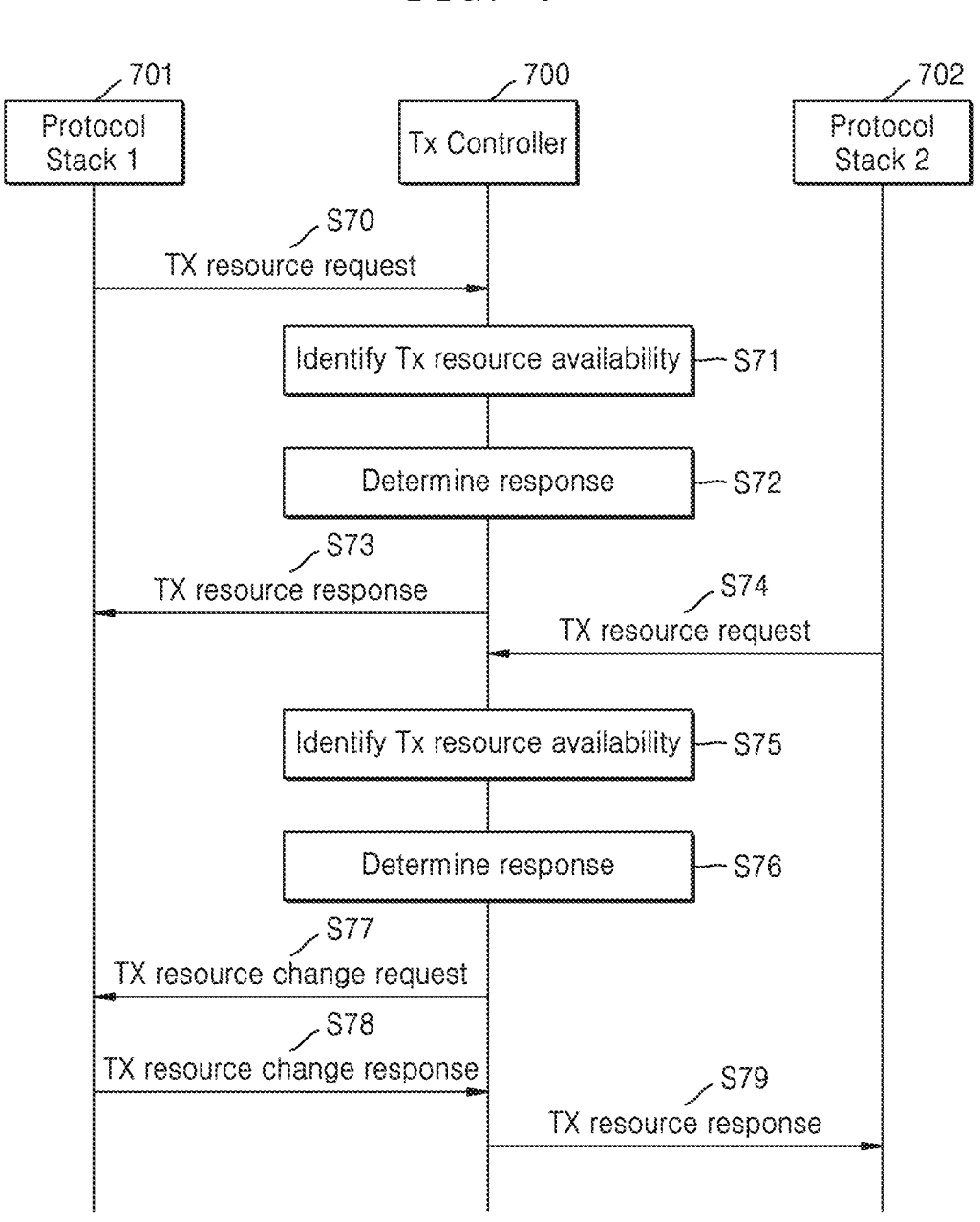
FIG. 7 is a flowchart schematically illustrating an example of an operation of the transmission controller of FIG. 6.

FIG. 7 is a flowchart schematically illustrating an example of an operation of the transmission controller of FIG. 6. FIGS. 8A and 8B illustrate embodiments of a transmission resource response message transmitted by the transmission controller of FIG. 6.

Referring to FIG. 7, an example of a transmission resource sharing scheme between a transmission controller 700, a first protocol stack 701 associated with a first SIM, and a second protocol stack 702 associated with a second SIM is schematically illustrated. It may be assumed that all RF transmission paths are not used by the first SIM or the second SIM before operation S70.

In operation S70, the first protocol stack 701 may transmit a transmission resource request message (Tx resource request), requesting allocation of at least one transmission resource, to the transmission controller 700. For example, the first protocol stack 701 may transmit a transmission resource request message, requesting allocation of one transmission resource, to the transmission controller 700.

In operation S71, in response to the transmission resource request message, the transmission controller 700 may check a use situation of an RF transmission path and may identify an available RF transmission resource (or an available RF transmission path). For example, because all RF transmission paths are not being used (e.g., none of the RF transmission path are in use) by the first SIM or the second SIM, the transmission controller 700 may identify the availability of two RF transmission resources. Also, an operation of identifying an available RF transmission resource of the transmission controller 700 may be periodically or aperiodically performed for a time for which the transmission resource sharing scheme is performed, but is not limited thereto.

The transmission controller 700 may determine a response to a transmission resource request in operation S72 and may transmit a transmission resource response message (Tx resource response) to the first protocol stack 701 on the basis of the determined response in operation S73. Referring to FIG. 8A, an example of a response message (Tx resource response) transmitted to the first protocol stack 701 by the transmission controller 700 in response to the transmission resource request is illustrated. For example, the transmission controller 700 may transmit a response message, including information (for example, 1. Tx port 0 grant) representing allocation of Tx port #0 corresponding to a port number 0 of the RF transmission path, to the first protocol stack 701.

In operation S74, when allocation of Tx port #0 to the first protocol stack 701 is completed, the second protocol stack 702 may transmit a transmission resource request message, requesting allocation of at least one transmission resource, to the transmission controller 700. For example, the second protocol stack 702 may transmit a transmission resource request message, requesting allocation of one transmission resource, to the transmission controller 700.

In operations S75 and S76, the same operations as (or similar operations to) operations S71 and S72 may be performed, and repeated descriptions are omitted.

For example, a response determined in operation S76 may be that one of the transmission resources previously allocated to the first protocol stack 701 is removed (deallocated from the first protocol stack 701) and the removed transmission resource is allocated to the second protocol stack 702.

In operation S77, the transmission controller 900 may transmit a transmission resource change request message (Tx resource change request) to the first protocol stack 701 on the basis of the determined response. In embodiments, referring to FIG. 8B, the transmission controller 700 may transmit a response message, including information (for example, 5. Remove Tx port 0) representing removal of Tx port #0 allocated to the first protocol stack 701, to the first protocol stack 701.

In operation S78, when the removal of the Tx port #0 is completed, the first protocol stack 701 which has received the transmission resource change request message may transmit a response message (Tx resource change response), including information representing that a change is completed, to the transmission controller 700.

In operation S79, the transmission controller 700 may transmit a response message (Tx resource response), including information representing that the removed Tx port #0 is allocated to the second protocol stack 702, to the second protocol stack 702.

In embodiments, although not shown in FIG. 7, a response determined in operation S76 may be that a transmission resource is not allocated to the second protocol stack 702. Referring to FIG. 8A, the transmission controller 700 may transmit a response message (Tx resource response), including information (for example, 4. Reject) representing that any RF path is not allocated thereto, to the second protocol stack 702. For example, when the second protocol stack 702 requests allocation of an RF transmission port 0 previously allocated to the first protocol stack 701 and a priority of the second protocol stack 702 is a lower priority on the basis of a priority algorithm of each stack, a response message including rejection may be transmitted. However, this are merely embodiments, and the inventive concepts are not limited thereto. In embodiments, a response message including the rejection may not be transmitted.

Figure 9:
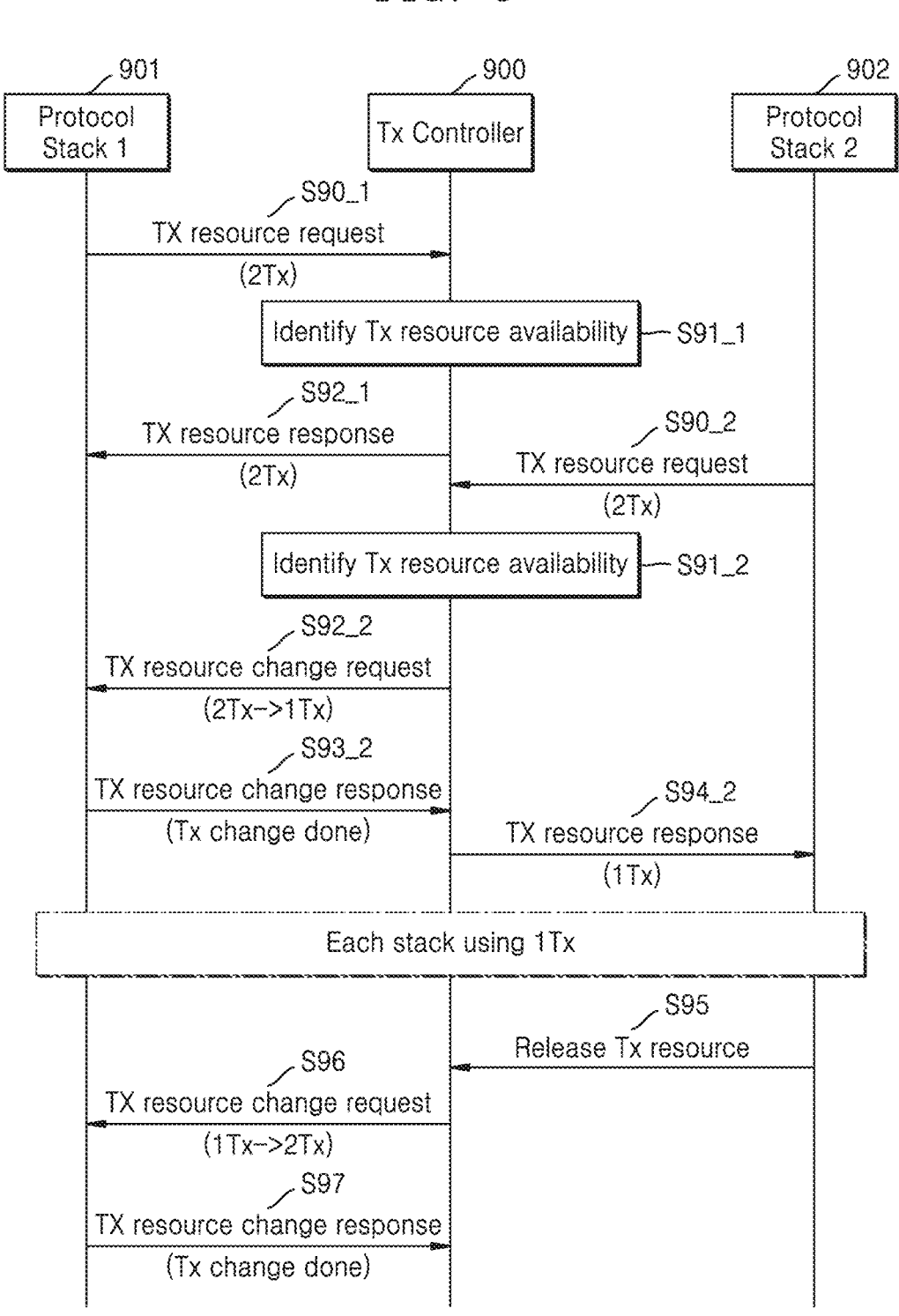
FIG. 9 is a flowchart illustrating embodiments of an operation of the transmission controller of FIG. 6.

FIG. 9 is a flowchart illustrating embodiments of an operation of the transmission controller of FIG. 6.

In FIG. 9, it may be assumed that first wireless communication associated with a first SIM and second wireless communication associated with a second SIM are 5G NR SA communication, and before operation S90_1, all RF transmission paths are not used (e.g., none of the RF transmission paths are in use) by the first SIM or the second SIM. Hereinafter, for convenience of description, description which is the same as or similar to description given above with reference to FIG. 7 may be omitted, and FIG. 9 will be described with reference to FIGS. 8A and 8B.

In operation S90_1, a first protocol stack 901 may transmit a transmission resource request message (Tx resource request), requesting allocation of two transmission resources (2Tx), to a transmission controller 900.

In operation S91_1, because all RF transmission paths are not used by the first SIM or the second SIM, the transmission controller 900 may identify the availability of two RF transmission resources, and thus, may determine a response to a transmission resource request.

In operation S92_1, the transmission controller 900 may transmit a transmission resource response message (Tx resource request) to the first protocol stack 901 on the basis of the determined response.

For example, referring to FIG. 8A, in response to the transmission resource request, the transmission controller 900 may transmit a response message, including information (for example, 3. Tx port 0 and Tx port 1 grant) representing allocation of Tx port #0 corresponding to a port number 0 of the RF transmission path and Tx port #1 corresponding to a port number 1 of the RF transmission path, to the first protocol stack 901.

In operation S90_2, when allocation of Tx port #0 and Tx port #1 to the first protocol stack 901 is completed, the second protocol stack 902 may transmit a transmission resource request message (Tx resource request), requesting allocation of two transmission resources, to the transmission controller 900.

In operation S91_2, the same operation as (or a similar operation to) operation S91_1 may be performed, and repeated descriptions are omitted. For example, the determined response may be that one of two transmission resources previously allocated to the first protocol stack 901 is removed and the one removed transmission resource is allocated to the second protocol stack 902.

In operation S92_2, the transmission controller 900 may transmit a transmission resource change request message (Tx resource change request) to the first protocol stack 901 on the basis of the determined response. In embodiments, referring to FIG. 8B, the transmission controller 900 may transmit a response message, including information (for example, 6. Remove Tx port 1) representing removal of Tx port #1 allocated to the first protocol stack 901, to the first protocol stack 901.

In operation S93_2, when the removal of the Tx port #1 is completed, the first protocol stack 901 which has received the transmission resource change request message may transmit a response message (Tx resource change response), including information representing that a change is completed, to the transmission controller 900.

In operation S94_2, the transmission controller 900 may transmit a response message (Tx resource response), including information representing that the removed Tx port #1 is allocated to the second protocol stack 902, to the second protocol stack 902.

At this time, the first protocol stack 901 may use the Tx port #0, and the second protocol stack 902 may use the Tx port #1 (Each stack using 1Tx). According to embodiments, the transmission controller 900 may simultaneously (or contemporaneously) generate and/or transmit signals via the first protocol stack 901 (e.g., the first SIM) and the second protocol stack 902 (e.g., the second SIM) to the first and second base stations 151 and 161, respectively, using the allocated transmission resources. According to embodiments, the transmission controller 900 may simultaneously (or contemporaneously) receive and/or demodulate signals from the first and second base stations 151 and 161 via the first protocol stack 901 (e.g., the first SIM) and the second protocol stack 902 (e.g., the second SIM), respectively, using the allocated transmission resources.

In operation S95, the second protocol stack 902 may transmit a message (Release Tx resource), including information representing that the Tx port #1 which is being used is released, to the transmission controller 900.

In operation S96, the transmission controller 900 may transmit the transmission resource change request message (Tx resource change request) to the first protocol stack 901. For example, referring to FIG. 8B, the transmission controller 900 may transmit a response message, including information (for example, 4. Add Tx port 1) representing that the Tx port #1 released by the second protocol stack 902 is additionally allocated to the first protocol stack 901, to the first protocol stack 901.

In operation S97, when addition of the Tx port #1 is completed, the first protocol stack 901 which has received the transmission resource change request message may transmit a response message (Tx resource change response), including information representing that a change is completed, to the transmission controller 900.

Figure 10A:
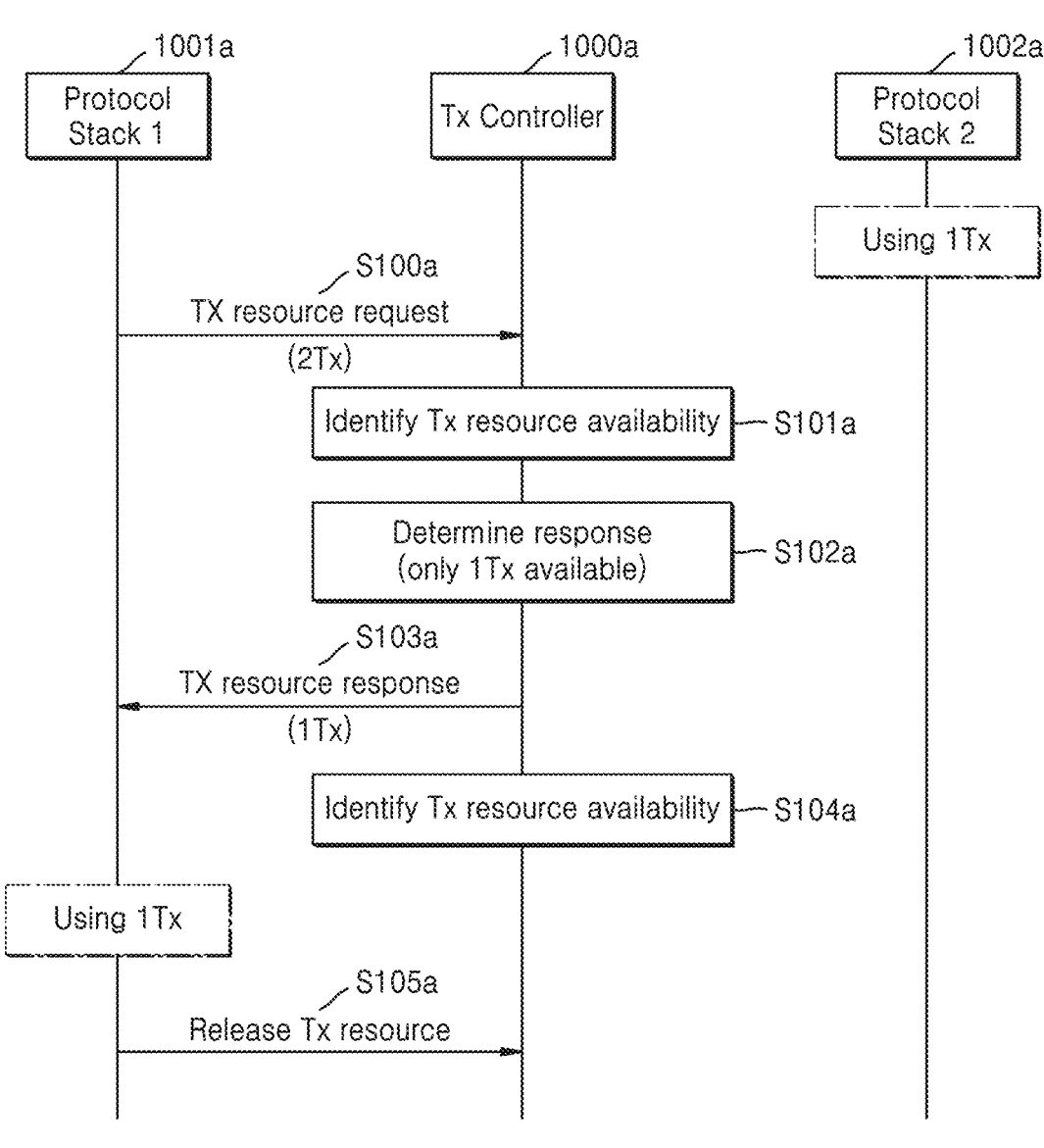
FIGS. 10A and 10B are flowcharts illustrating embodiments of an operation of the transmission controller of FIG. 6.
Figure 10B:
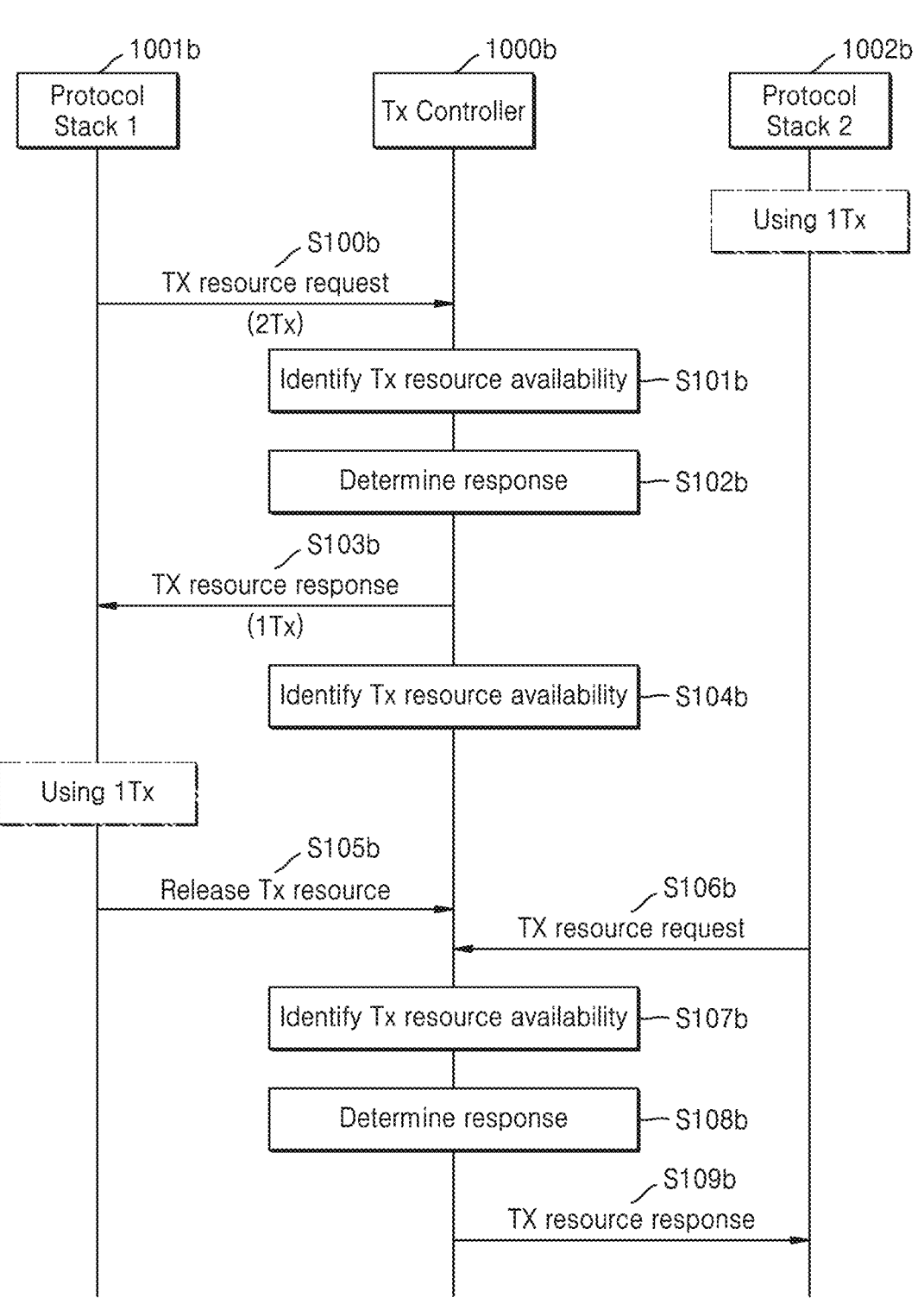

FIGS. 10A and 10B are flowcharts illustrating embodiments of an operation of the transmission controller of FIG. 6.

In FIG. 10A, it may be assumed that a first wireless communication associated with a first SIM is 5G NR SA communication involving at least two RF transmission paths and a second wireless communication (e.g., using the second protocol stack 1002a) associated with a second SIM is 4G LTE communication involving at least one RF transmission path. Before operation S100a, it may be assumed that one RF transmission path is being used by the second SIM (Using 1Tx).

In operation S100a, a first protocol stack 1001a may transmit a transmission resource request message (Tx resource request), requesting allocation of two transmission resources (2Tx), to the transmission controller 1000a. In operations S101a and S102a, because one RF transmission path is being used by the second SIM, the transmission controller 1000a may identify the availability of one RF transmission resource and may determine that a response to the transmission resource request represents allocation of one RF transmission resource. Therefore, in operation S103a, the transmission controller 1000a may transmit a transmission resource response message (Tx resource response) to the first protocol stack 1001a.

As described above, an operation of identifying an available RF transmission resource for a time for which a transmission resource sharing scheme is performed may be periodically or aperiodically performed (operation S104a), and thus, for example, the transmission controller 1000a may identify the available RF transmission resource. For example, it may be identified that one RF transmission path is being used by a first SIM, the other RF transmission path being is used by the second SIM, and there is no available RF transmission resource.

In operation S105a, when the use of the one RF transmission resource by the first SIM is completed, the first protocol stack 1001a may transmit a message (Release Tx resource), including information representing that allocation of a corresponding RF transmission resource is released, to the transmission controller 1000a.

In FIG. 10B, it may be assumed that a first wireless communication associated with a first SIM (e.g., using the first protocol stack 1001b) and a second wireless communication associated with a second SIM are 5G NR SA communication. Before operation S100a, it may be assumed that one RF transmission path is being used by the second SIM (Using 1Tx).

Operations performed in operations S100b to 105b may be substantially the same as operations performed in operations S100a to 105b of FIG. 10A, and repeated operations are omitted.

According to embodiments of FIG. 10B, unlike FIG. 10A, the second wireless communication associated with the second SIM may be 5G NR SA communication involving at least two RF transmission paths, and thus, in operation S106B, a transmission resource request message (Tx resource request) requesting allocation of one transmission resource may be additionally transmitted to the transmission controller 1000b.

In operations S107b and S108b, the transmission controller 1000b may identify the availability of one RF transmission resource and may determine that a response to the transmission resource request represents allocation of one RF transmission resource.

Therefore, in operation S109b, the transmission controller 1000b may transmit a transmission resource response message (Tx resource response) to the second protocol stack 1002b.

Figure 11:
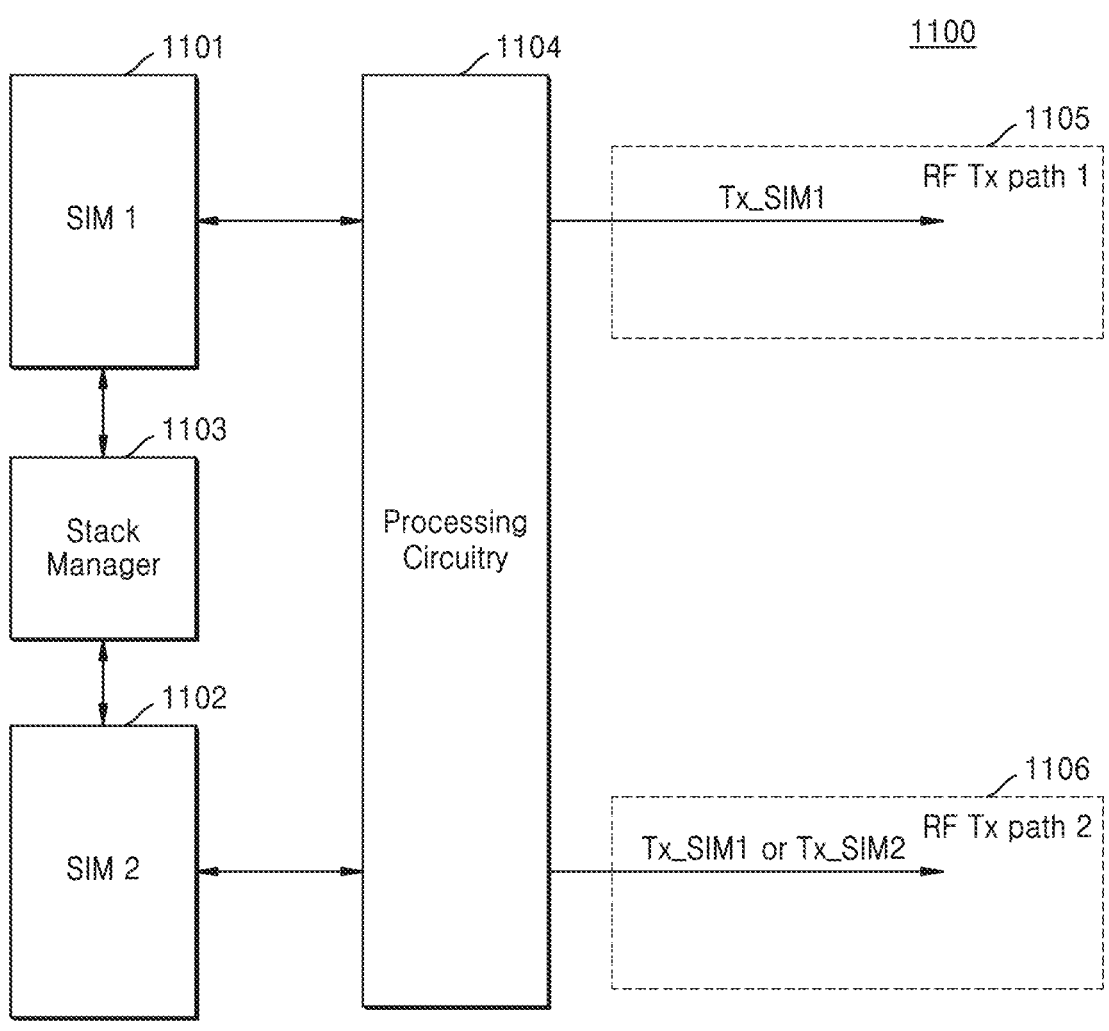
FIG. 11 is a block diagram illustrating a hardware controller according to embodiments.

FIG. 11 is a block diagram illustrating a hardware controller according to embodiments. For convenience of description, FIG. 11 will be described below with reference to FIGS. 2 and 4 to 6.

Referring to FIGS. 4 to 11, the first protocol stack 401 and the second protocol stack 402 illustrated in FIG. 4 may be applied to a first protocol stack associated with a first SIM 1101 of FIG. 11 and a second protocol stack associated with a second SIM 1102 of FIG. 11, and their repeated descriptions are omitted. Also, referring to FIGS. 2 to 11, the baseband processor 240 and the two RF transmission paths 230_1 and 230_2 of FIG. 2 may be applied to a baseband processor 1104 and two RF transmission paths 1105 and 1106 of FIG. 11, and their repeated descriptions are omitted. In embodiments, at least some of the blocks illustrated in FIG. 11 may be implemented as a hardware logic, and in embodiments, may be implemented as a software module executed by at least one processor.

Hereinafter, it may be assumed that a UE (e.g., the UE 200) according to embodiments includes two RF transmission paths, a first wireless communication associated with a first SIM is 5G NR SA communication involving at least two RF transmission paths, and a second wireless communication associated with a second SIM is 4G LTE communication involving at least one RF transmission path.

Referring to FIG. 11, a hardware controller 1100 may include a first SIM 1101, a second SIM 1102, a stack manager 1103, a baseband processor 1104, and/or two RF transmission paths 1105 and 1106.

For example, when the hardware controller 1100 receives a transmission resource response message (Tx resource response) from a transmission controller (600 of FIG. 6), the hardware controller 1100 may set hardware (Tx HW) of a transmitting side on the basis of each protocol stack associated with each SIM. For example, in response to one RF transmission path allocation request transmitted to the transmission controller (600 of FIG. 6) by the first SIM 1101, the transmission controller (600 of FIG. 6) may transmit a transmission resource response message, including information indicating allocation of an RF Tx path 1 1105 to the first SIM 1101, to the first SIM 1101.

The hardware controller 1100 (or the stack manager 1103) may receive a command and may change a configuration of the RF Tx Path 1 1105 including a matching circuit, filters, amplifiers, a mixer and/or the baseband processor 1104 on the basis of the command. For example, the hardware controller 1100 or a stack manager of a first SIM managing a first protocol stack may correct hardware settings in order for the first SIM 1101 to use the RF Tx Path 1 1105. According to embodiments, the hardware controller 1100 may perform similar operations with respect to the second SIM 1102 and/or the RF Tx Path 2 1106.

Figure 12:
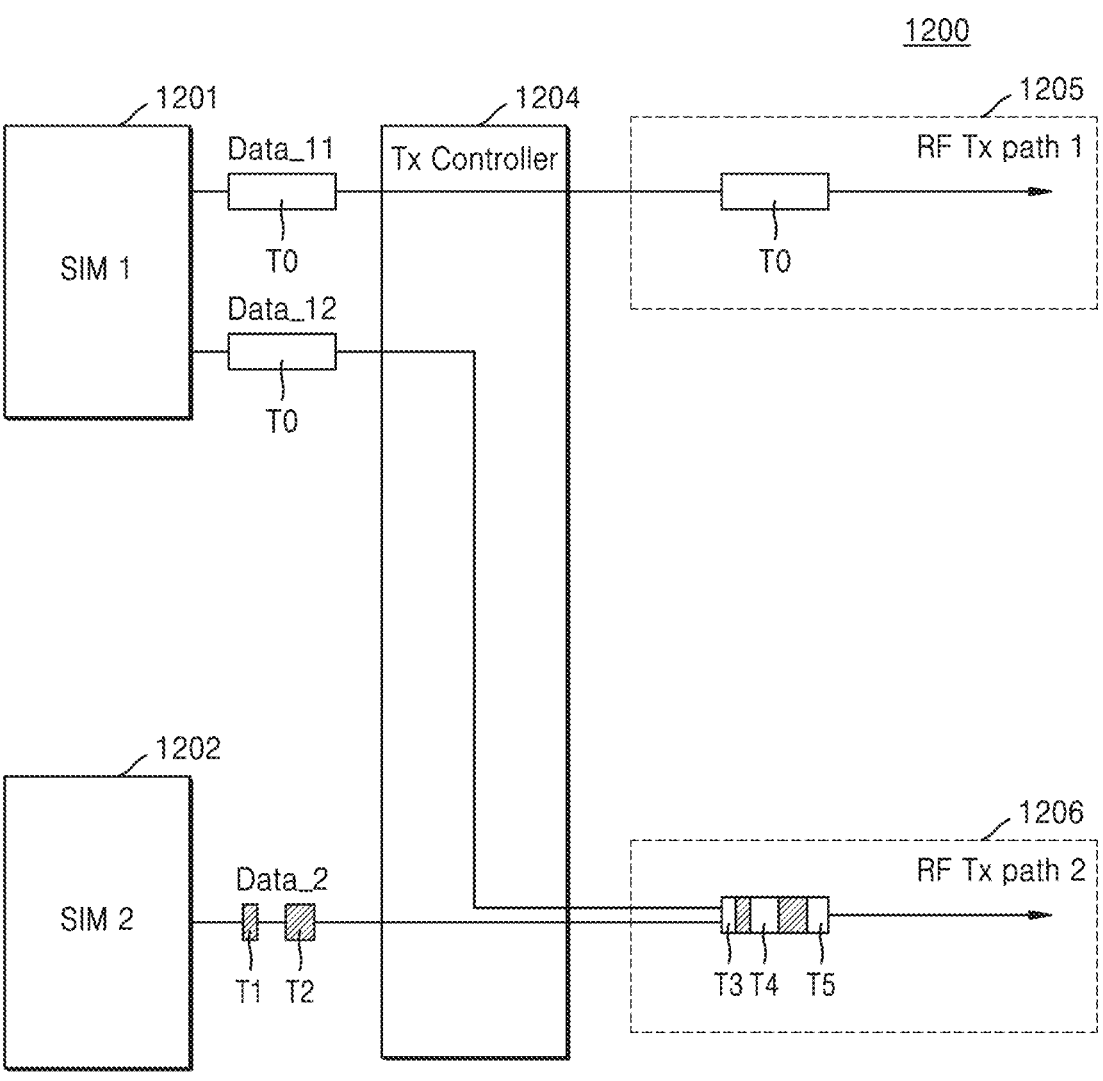
FIG. 12 is a block diagram illustrating a transmission resource sharing system of user equipment according to embodiments.

FIG. 12 is a block diagram illustrating a transmission resource sharing scheme of user equipment according to embodiments.

Hereinafter, it may be assumed that UE according to embodiments includes two RF transmission paths, a first wireless communication associated with a first SIM is 5G NR SA communication involving at least two RF transmission paths, and a second wireless communication associated with a second SIM is 4G LTE communication involving at least one RF transmission path. Also, it may be assumed that the first SIM uses INT PDN and the second SIM uses only IMS PDN.

A transmission resource sharing system 1200 according to embodiments may include a first SIM 1201, a second SIM 1202, a transmission controller 1204, and/or two RF transmission paths 1105 and 1106. The transmission resource sharing system 1200 according to embodiments may be applied to a case where a sum of the maximum (or highest) number of RF transmission paths allocatable to the first SIM 1201 (for example, first wireless communication associated with the first SIM 1201 is 5G NR SA communication, and thus, a maximum of two) and the maximum (or highest) number of RF transmission paths allocatable to the second SIM 1202 (for example, second wireless communication associated with the second SIM 1202 is 4G LTE communication, and thus, a maximum of one) is less than the number of RF transmission paths (for example, two RF transmission paths) supportable to (e.g., by) the UE (e.g., the UE 200).

A multi-SIM device (300 of FIG. 3) according to embodiments may control a transmission resource sharing scheme which will be described below by using the transmission resource sharing system 1200.

Referring to FIG. 12, the first SIM 1201 may output two pieces of data Data_11 and Data_12 for a time T0 (e.g., in every time period), and the second SIM 1202 may output one piece of data Data_2 for the time T0 (e.g., in every time period). For example, the pieces of data Data_11 and Data_12 may be Internet data for communication based on INT PDN, and the data Data_2 may be voice over LTE (VoLTE) or voice over NR (VoNR) call data based on IMS PDN.

In a conventional DSDA device, three RF transmission paths may be used for simultaneous (or contemporaneous) operations of the first SIM 1201 and the second SIM 1202. On the other hand, the transmission resource sharing system 1200 included in UE according to embodiments may support a simultaneously (or contemporaneously) connected state of a plurality of SIMs by using only two RF transmission paths, and thus, a plurality of hardware devices configuring an RF chain of an RFIC may be reduced, thereby providing a more cost-efficient method.

For example, in a case where the transmission controller 1204 operates in a state where the first SIM 1201 using INT PDN and the second SIM 1202 using IMS PDN are simultaneously (or contemporaneously) connected to each other, for example, scheduling may be performed so that the RF Tx path 1 is used by the first SIM 1201 and an RF Tx path 2 is used by the second SIM 1201 in a period T1 or T2. In this case, the RF Tx Path 2 allocated for operating in a state where the second SIM 1202 is connected thereto may be referred to as a target RF transmission path.

Also, in a case where the transmission controller 1204 does not operate in a state where the first SIM 1201 using INT PDN and the second SIM 1202 using IMS PDN are simultaneously (contemporaneously) connected to each other, for example, scheduling may be performed so that all (e.g., both) of the RF Tx path 1 and an RF Tx path 2 are used by the first SIM 1201 in a period T3, T4, or T5. Such a scheme may be referred to as a transmission resource sharing scheme (e.g., time division multiplexing).

Therefore, the UE (e.g., the UE 200) may select, as a target RF transmission path, at least one RF transmission path from among a plurality of RF transmission paths, and may alternately allocate the target RF transmission path to the first SIM 1201 and the second SIM 1202 on the basis of a communication period (for example, the periods T1 and T2) of a second network. Therefore, according to the transmission resource sharing scheme, in embodiments, an RF transmission path may be allocated to at least one SIM, and wireless communication may be performed. For example, according to embodiments, time division multiplexing may be performed on the target RF transmission path between the first SIM 1201 and the second SIM 1202 in which allocation of the target RF transmission path alternates periodically (e.g., according to the communication period) between the first SIM 1201 and the second SIM 1202.

The transmission resource sharing system 1200 illustrated in FIG. 12 are merely embodiments, and the inventive concepts may include a UE having three or more RF transmission paths, and may be applied to other wireless communication involving three or more RF transmission paths, namely, may have forward compatibility.

In embodiments, when a UE including three or more RF transmission paths and a first wireless communication associated with a first SIM involving three or more RF transmission paths are assumed, two or more target RF transmission paths for a second SIM may be selected. In this case, one or more target RF transmission paths may be provided based on a channel state (e.g., a measure of the quality of the channel, such as, a signal to noise ratio, a signal to interference and noise ratio, a received signal strength indicator, reference signal received power, etc.) of the first wireless communication. For example, when it is determined that the channel state of the first wireless communication is at a certain level (e.g., a threshold level) or more, two target RF transmission paths may be selected. Otherwise, one target RF transmission path may be selected. Alternatively, when the channel state of the first wireless communication is less than a reference level, the transmission resource sharing scheme described above may not be performed, and a target RF transmission path may not be selected.

Figure 13:
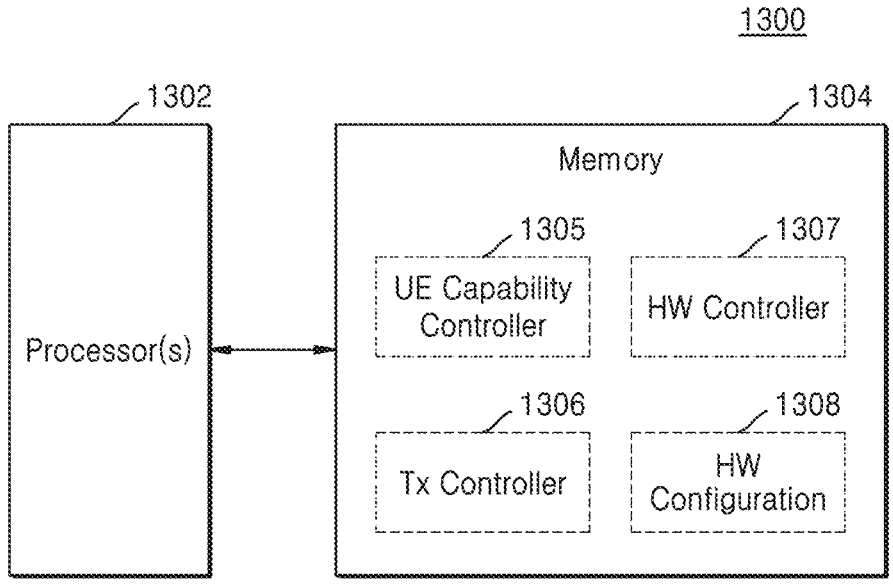
FIG. 13 is a block diagram illustrating an example of a multi-SIM device of FIG. 1 according to embodiments.

FIG. 13 is a block diagram illustrating an example of a multi-SIM device of FIG. 1 according to embodiments.

As illustrated in FIG. 13, a multi-SIM device 1300 may include at least one processor 1302 and a memory 1304, and the at least one processor 1302 and the memory 1304 may be connected to one another so as to enable communication therebetween.

The at least one processor 1302 may execute a program code including instructions, and thus, a desired operation may be performed. The at least one processor 1302, for example, may be referred to as a hardware-implemented data processing device which includes operations expressed as instructions and/or a code included in a program and includes a circuit physically structuralized to execute a desired operation. In embodiments, for non-limiting example, the hardware-implemented data processing device may include a central processing unit (CPU), a processor core, a multi-core processor, a multi-processor, an application processor (AP), a communication processor (CP), an application specific integrated circuit (ASIC), and/or a field programmable gate array (FPGA).

The memory 1304 may be accessed by the at least one processor 1302, and as illustrated in FIG. 13, may include a UE capability controller 1305, a transmission controller 1306, a hardware controller 1307, and/or a hardware configuration 1308. For non-limiting example, the memory 1304 may include a type of memory accessible by the at least one processor 132 like random access memory (RAM), read only memory (ROM), a tape, a magnetic disk, an optical disk, volatile memory, non-volatile memory, and/or a combination thereof. In embodiments, the UE capability controller 1305, the transmission controller 1306, the hardware controller 1307, and/or the hardware configuration 1308 may be respectively stored in different memory devices separated from one another.

The at least one processor 1302 may execute at least one of the UE capability controller 1305, the transmission controller 1306, and/or the hardware controller 1307 stored in the memory 1304, and thus, may perform at least some of operations of a multi-SIM device (130 of FIG. 1) described above with reference to the drawings. For example, the at least one processor 132 may execute the UE capability controller 1305, and thus, may detect a plurality of SIMs to generate a UE capability message so as to support a transmission resource sharing scheme and may transmit the UE capability message to a network. Also, the at least one processor 1302 may execute the transmission controller 1306, and thus, may refer to the hardware configuration 1308 stored in the memory 1304, receive a transmission resource request message, check a used situation of an RF transmission path in response thereto, and determine a use authority of an RF transmission path of each SIM. For example, the hardware configuration 1308 may include information about an RF resource provided by the transceiver 120 of FIG. 1, and for example, may include information about a configuration of CA and/or MC or a frequency band supported by each Tx port.

Conventional devices for implementing a dual SIM dual active (DSDA) scheme include sufficient RF transmission paths to enable all of the SIMs (e.g., both SIMs) of the device to simultaneously (or contemporaneously) communicate using a highest number of RF transmission paths usable by the respective communication protocols utilized by the SIMs. Such conventional devices are costly to manufacture and consume excessive resources (e.g., hardware, power, bandwidth, processor, memory, etc.).

However, according to embodiments, improved devices are provided for implementing a DSDA scheme. For example, the improved devices permit two or more SIMs to share one or more of the RF transmissions paths (e.g., using time division multiplexing, reducing a number of RF transmission paths used for a communication protocol involving a plurality of RF transmission paths, etc.). Accordingly, the improved devices overcome the deficiencies of the conventional devices to at least implement a DSDA scheme while reducing manufacturing costs and resource consumption (e.g., hardware, power, bandwidth, processor, memory, etc.).

According to embodiments, operations described herein as being performed by the UE 100, the first base station 151, the second base station 161, the transceiver 120, the multi-SIM device 130, the UE 200, the RFIC 220, the RF chains 222_1, 222_2, 224_1, and/or 224_2, the DACs 226_1 and/or 226_2, the ADCs 228_1 and/or 228_2, the baseband processor 240, the SIM detector 250, the multi-SIM device 300, the UE capability controller 302, the transmission controller 304, the hardware controller 306, the UE capability controller 400, the first protocol stack 401, the second protocol stack 402, the hardware interface 406, the SIM detector 405, the first protocol stack 601, the second protocol stack 602, the transmission controller 600, the transmission controller 700, the first protocol stack 701, the second protocol stack 702, the first protocol stack 901, the transmission controller 900, the second protocol stack 902, the first protocol stack 1001a, the transmission controller 1000a, the second protocol stack 1002a, the first protocol stack 1001b, the transmission controller 1000b, the second protocol stack 1002b, the hardware controller 1100, the stack manager 1103, the baseband processor 1104, the transmission resource sharing system 1200, the transmission controller 1204, the multi-SIM device 1300 and/or the at least one processor 1302 may be performed by processing circuitry. The term 'processing circuitry,' as used in the present disclosure, may refer to, for example, hardware including logic circuits; a hardware/software combination such as a processor executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc.

The various operations of methods described above may be performed by any suitable device capable of performing the operations, such as the processing circuitry discussed above. For example, as discussed above, the operations of methods described above may be performed by various hardware and/or software implemented in some form of hardware (e.g., processor, ASIC, etc.).

The software may comprise an ordered listing of executable instructions for implementing logical functions, and may be embodied in any "processor-readable medium" for use by or in connection with an instruction execution system, apparatus, or device, such as a single or multiple-core processor or processor-containing system.

The blocks or operations of a method or algorithm and functions described in connection with embodiments disclosed herein may be embodied directly in hardware, in a software module executed by a processor, or in a combination of the two. If implemented in software, the functions may be stored on or transmitted over as one or more instructions or code on a tangible, non-transitory computer-readable medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art.

Embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particular manner, a function or operation specified in a specific block may be performed differently from the flow specified in a flowchart, flow diagram, etc. For example, functions or operations illustrated as being performed serially in two consecutive blocks may actually be performed concurrently, simultaneously, contemporaneously, or in some cases be performed in reverse order. As used herein the term "and/or" includes any and all combinations of one or more of the associated listed items.

While the inventive concepts have been particularly shown and described with reference to embodiments thereof, it will be understood that various changes in form and details may be made therein without departing from the spirit and scope of the following claims.

What is claimed is:

1. An operating method of a user equipment supporting dual subscriber identity module (SIM) dual active (DSDA), the operating method comprising:
    performing a first communication with a first base station through a first network via a plurality of radio frequency (RF) transmission paths allocated to a first SIM, the plurality of RF transmission paths being included in a set of RF transmission paths of the user equipment, the plurality of RF transmission paths including a first RF transmission path and a second RF transmission path, and each respective RF transmission path among the set of RF transmission paths including hardware of the user equipment;
    determining whether a first number of RF transmission paths included in the set of RF transmission paths is equal to a second number of RF transmission paths included in the plurality of RF transmission paths in response to a resource allocation request from a second SIM, the resource allocation request corresponding to a second communication with a second base station through a second network;
    first allocating the first RF transmission path to each of the first SIM and the second SIM based on a time division multiplexing (TDM) scheme in response to determining the first number of RF transmission paths is equal to the second number of RF transmission paths; and
    second allocating the second RF transmission path to the first SIM contemporaneous with the first allocating, wherein
        the first communication is performed contemporaneously through both of the first RF transmission path and the second RF transmission path in response to the first allocating and the second allocating, and
        the second communication is performed through the first RF transmission path in response to the first allocating, wherein configuring of a capability of the user equipment for the first communication comprises:
    configuring a sounding reference signal (SRS) transmission scheme of the first communication to be a one-transmission and multi-reception antenna scheme.

2. The operating method of claim 1, wherein the first number of RF transmission paths is less than a sum of a maximum number of RF transmission paths allocatable to the first SIM and a maximum number of RF transmission paths allocatable to the second SIM.

3. The operating method of claim 1, wherein
    the first network comprises a $4^{th}$ generation (4G) network or a stand-alone type $5^{th}$ generation (5G) network; and
    the second network comprises the 4G network or the stand-alone type 5G network.

4. The operating method of claim 1, wherein
    the first communication comprises a communication based on an Internet packet data network (PDN); and
    the second communication comprises a voice over long term evolution (VoLTE) call or a voice over new radio (VoNR) call based on an Internet protocol multimedia subsystem (IMS) PDN.

5. The operating method of claim 1, further comprising:
    changing a configuration of capability of the user equipment, the first allocating being based on the configuration of capability;
    generating a user equipment (UE) capability message based on the configuration of capability; and
    transmitting the UE capability message to the first base station and the second base station.

6. The operating method of claim 5, wherein the UE capability message comprises at least one of sounding reference signal (SRS) supporting scheme information or uplink rank information.

7. The operating method of claim 1, wherein the first allocating comprises:
    selecting the first RF transmission path from among the plurality of RF transmission paths; and
    alternately allocating the first RF transmission path to the first SIM and the second SIM according to a communication period of the second network.

8. The operating method of claim 7, wherein the first allocating is performed based on an availability of each of the plurality of RF transmission paths.

9. The operating method of claim 1, wherein
    the first allocating includes allocating at least one of the plurality of RF transmission paths to each of the first SIM and the second SIM, the at least one of the plurality of RF transmission paths including the first RF transmission path; and
    the operating method further comprises,
        selecting the at least one of the plurality of RF transmission paths from among the plurality of RF transmission paths,
        alternately allocating the at least one of the plurality of RF transmission paths to the first SIM and the second SIM based on a communication period of the second network, and
        determining a third number of RF transmission paths included in the at least one of the plurality of RF transmission paths based on a channel state of the first network.

10. The operating method of claim 1, wherein
    the first allocating includes allocating at least one of the plurality of RF transmission paths to each of the first SIM and the second SIM, the at least one of the plurality of RF transmission paths including the first RF transmission path; and the operating method further includes at least one of,
alternately allocating the at least one of the plurality of RF transmission paths to the first SIM and the second SIM based on a communication period of the second network, or determining a third number of RF transmission paths included in the at least one of the plurality of RF transmission paths based on a channel state of the first network.

11. A user equipment supporting dual subscriber identity module (SIM) dual active (DSDA), the user equipment comprising:
a first SIM and a second SIM;
a transmitter configured to form a set of radio frequency (RF) transmission paths, each respective RF transmission path among the set of RF transmission paths including hardware of the user equipment; and
processing circuitry configured to,
cause the transmitter to perform a first communication with a first base station through a first network via a plurality of RF transmission paths allocated to the first SIM, the plurality of RF transmission paths being included in the set of RF transmission paths, and the plurality of RF transmission paths including a first RF transmission path and a second RF transmission path,
determine whether a first number of RF transmission paths included in the set of RF transmission paths is equal to a second number of RF transmission paths included in the plurality of RF transmission paths in response to a resource allocation request from the second SIM, the resource allocation request corresponding to a second communication with a second base station through a second network,
first allocate the first RF transmission path to each of the first SIM and the second SIM based on a time division multiplexing (TDM) scheme in response to determining the first number of RF transmission paths is equal to the second number of RF transmission paths,
second allocate the second RF transmission path to the first SIM contemporaneous with the first allocation,
cause the transmitter to perform the first communication contemporaneously through both of the first RF transmission path and the second RF transmission path based on the first allocation and the second allocation, and
cause the transmitter to perform the second communication through the first RF transmission path based on the first allocation,
wherein configuring of a capability of the user equipment for the first communication comprises:
configuring a sounding reference signal (SRS) transmission scheme of the first communication to be a one-transmission and multi-reception antenna scheme.

12. The user equipment of claim 11, wherein the first number of RF transmission paths is less than a sum of a maximum number of RF transmission paths allocatable to the first SIM and a maximum number of RF transmission paths allocatable to the second SIM.

13. The user equipment of claim 11, wherein the first network comprises a 4$^{th}$ generation (4G) network or a stand-alone type 5$^{th}$ generation (5G) network; and

the second network comprises the 4G network or the stand-alone type 5G network.

14. The user equipment of claim 11, wherein
the first communication comprises a communication based on an Internet packet data network (PDN); and
the second communication comprises a voice over long term evolution (VoLTE) call or a voice over new radio (VoNR) call based on an Internet protocol multimedia subsystem (IMS) PDN.

15. The user equipment of claim 11, wherein the processing circuitry is configured to:
change a configuration of capability of the user equipment, the first allocation including allocating at least one of the plurality of RF transmission paths to each of the first SIM and the second SIM being based on the configuration of capability;
generate a user equipment (UE) capability message based on the configuration of capability; and
transmit the UE capability message to the first base station and the second base station.

16. The user equipment of claim 15, wherein the UE capability message comprises at least one of sounding reference signal (SRS) supporting scheme information or uplink rank information.

17. The user equipment of claim 11, wherein the processing circuitry is configured to first allocate the first RF transmission path to each of the first SIM and the second SIM by:
selecting the first RF transmission path from among the plurality of RF transmission paths; and
alternately allocating the first RF transmission path to the first SIM and the second SIM according to a communication period of the second network.

18. The user equipment of claim 17, wherein the processing circuitry is configured to first allocate the first RF transmission path to each of the first SIM and the second SIM an availability of each of the plurality of RF transmission paths.

19. The user equipment of claim 11, wherein the processing circuitry is configured to:
first allocate at least one of the plurality of RF transmission paths to each of the first SIM and the second SIM, the at least one of the plurality of RF transmission paths including the first RF transmission path,
select the at least one of the plurality of RF transmission paths from among the plurality of RF transmission paths,
alternately allocate the at least one of the plurality of RF transmission paths to the first SIM and the second SIM based on a communication period of the second network, and
determine a third number of RF transmission paths included in the at least one of the plurality of RF transmission paths based on a channel state of the first network.

20. The user equipment of claim 11, wherein
the first allocation includes allocating at least one of the plurality of RF transmission paths to each of the first SIM and the second SIM, the at least one of the plurality of RF transmission paths including the first RF transmission path; and
the processing circuitry is configured to,
alternately allocate the at least one of the plurality of RF transmission paths to the first SIM and the second SIM based on a communication period of the second network, or determine a third number of RF transmission paths included in the at least one of the plurality of RF transmission paths based on a channel state of the first network.

* * * * *